US011117450B2

(12) United States Patent
Irie et al.

(10) Patent No.: US 11,117,450 B2
(45) Date of Patent: Sep. 14, 2021

(54) VEHICLE WINDSHIELD AND ARTICLE FOR VEHICLE

(71) Applicant: AGC INC., Tokyo (JP)

(72) Inventors: Tetsuji Irie, Tokyo (JP); Nana Sato, Tokyo (JP); Kazuhiko Kawasaki, Tokyo (JP); Hideyuki Saito, Tokyo (JP); Naoki Ogawa, Tokyo (JP)

(73) Assignee: AGC INC., Tokyo (JP)

(*) Notice: Subject to any disclaimer, the term of this patent is extended or adjusted under 35 U.S.C. 154(b) by 49 days.

(21) Appl. No.: 16/549,584

(22) Filed: Aug. 23, 2019

(65) Prior Publication Data
US 2019/0375275 A1 Dec. 12, 2019

Related U.S. Application Data

(63) Continuation of application No. PCT/JP2018/008492, filed on Mar. 6, 2018.

(30) Foreign Application Priority Data

Mar. 21, 2017 (JP) .............................. JP2017-054555

(51) Int. Cl.
B32B 3/00 (2006.01)
B60J 1/00 (2006.01)
(Continued)

(52) U.S. Cl.
CPC .............. B60J 1/002 (2013.01); B32B 7/12 (2013.01); B32B 17/10036 (2013.01);
(Continued)

(58) Field of Classification Search
CPC .... B60J 1/02; B60J 1/002; B32B 7/12; B32B 17/10036; B32B 2255/20;
(Continued)

(56) References Cited

U.S. PATENT DOCUMENTS 10,507,709 B2 * 12/2019 Irie .......................... B32B 7/023
2009/0239017 A1 9/2009 Ishioka
(Continued)

FOREIGN PATENT DOCUMENTS

JP 5401471 B2 1/2014
WO WO-2014/061509 A1 4/2014

OTHER PUBLICATIONS

International Searching Authority, "International Search Report," issued in connection with International Patent Application No. PCT/JP2018/008492, dated Jun. 5, 2018.
International Searching Authority, "Written Opinion," issued in connection with International Patent Application No. PCT/JP2018/008492, dated Jun. 5, 2018.

Primary Examiner — Elizabeth E Mulvaney
(74) Attorney, Agent, or Firm — Foley & Lardner LLP

(57) ABSTRACT

A vehicle windshield includes a window plate and an anti-fogging film provided on an interior side surface of the window plate, with a first region and a second region within a see-through region. The anti-fogging film is not on the first region but on the second region. The first region includes a belt-like region in an upper portion of the see-through region. The second region is a region that includes at least a test area B and that includes a continuous projection portion provided on an upper side. The anti-fogging film in the second region has a minimum film thickness of no less than 5 μm. At least a boundary between the first region and the second region excluding the projection portion has no perspective distortion and is formed by a boundary line having a linewidth of 10-200 μm that is visually recognized by scattering of incoming light.

14 Claims, 8 Drawing Sheets

(51) Int. Cl.
  *B32B 17/10* (2006.01)
  *B32B 7/12* (2006.01)
  *H04N 5/225* (2006.01)

(52) U.S. Cl.
  CPC ....... *B32B 2255/20* (2013.01); *B32B 2255/26* (2013.01); *B32B 2307/4023* (2013.01); *B32B 2307/412* (2013.01); *B32B 2605/006* (2013.01); *B32B 2605/08* (2013.01); *H04N 5/2253* (2013.01)

(58) Field of Classification Search
  CPC ...... B32B 2307/4023; B32B 2605/006; B32B 2605/08
  See application file for complete search history.

(56) References Cited

U.S. PATENT DOCUMENTS

| | | |
|---|---|---|
| 2010/0314378 A1 | 12/2010 | Grunert et al. |
| 2015/0210144 A1 | 7/2015 | Ishioka |
| 2018/0215239 A1* | 8/2018 | Maeta ...................... B60J 1/002 |
| 2019/0283549 A1* | 9/2019 | Oya .................. B32B 17/10633 |
| 2019/0375276 A1* | 12/2019 | Irie ................... B32B 17/10036 |
| 2020/0023618 A1* | 1/2020 | Teranishi ............. H04N 5/2254 |
| 2020/0062086 A1* | 2/2020 | Irie .................. B32B 17/10165 |
| 2020/0079185 A1* | 3/2020 | Kondo ............. B32B 17/10036 |
| 2020/0223188 A1* | 7/2020 | Oya ........................ B32B 27/20 |

* cited by examiner

VEHICLE WINDSHIELD AND ARTICLE FOR VEHICLE

CROSS REFERENCE TO RELATED APPLICATIONS

This is a bypass continuation of International Patent Application No. PCT/JP2018/008492, filed on Mar. 6, 2018, which claims priority to Japanese Patent Application No. 2017-054555, filed on Mar. 21, 2017. The contents of these applications are hereby incorporated herein in their entireties by reference.

BACKGROUND

The present invention relates to vehicle windshields and articles for vehicles.

BACKGROUND ART

Conventionally, for the purpose of assisting a driver in driving or the like, an optical device is installed on a vehicle interior side of a vehicle windshield (hereinafter, also referred to simply as a "windshield"), and this optical device includes an optical member, such as a sensor or a camera, for acquiring information on the outside of the vehicle through the windshield.

However, since the optical member acquires the information from the outside of the vehicle through the windshield, when the windshield fogs up, there arises a problem in that accurate information cannot be obtained. To address this problem, in one known technique, a windshield is locally heated with a heating wire or the like to suppress fogging (see, for example, Japanese Patent No. 5401471).

Meanwhile, it is known that glass provided with an anti-fogging film is used as a windshield, in which the anti-fogging film that includes a water-absorbing cross-linked resin layer obtained from a water-absorbing resin, such as polyepoxides, is provided on a surface of the glass and the anti-fogging film thus absorbs and removes tiny water droplets that could cause fogging. With regard to a windshield provided with an anti-fogging film, for example, International Patent Publication No. WO2014/061509 discloses a windshield that can simply and reliably let a driver recognize an occurrence status of fogging by utilizing a difference in the anti-fogging performance associated with the magnitude of the film thickness of the anti-fogging film.

SUMMARY

In the above, the anti-fogging film is disposed on the vehicle interior side. Thus, when an optical device is attached to the windshield provided with the anti-fogging film, there arises a problem in that the optical device fails to be bonded with sufficient strength due to an influence of the anti-fogging film present at a portion where the optical device is attached. Accordingly, it is conceivable to remove the anti-fogging film at the portion where the optical device is attached and to dispose the anti-fogging film in an island-like manner at a portion corresponding to the optical member. In this case, although the strength with which the optical device is bonded improves, the anti-fogging performance on the front surface of the optical device may not be sufficient in some cases.

The present invention has been made in view of the above and is directed to providing a vehicle windshield provided with an anti-fogging film in which, when an optical device is attached to the vehicle windshield, the optical device is bonded with high bonding strength and sufficient anti-fogging performance is exhibited in a sensing region of the optical device and directed to providing an article for a vehicle having such a vehicle windshield and an optical device.

Solution to Problem

The present invention provides a vehicle windshield and an article for a vehicle having the following configurations.

The vehicle windshield according to the present invention includes a window plate and an anti-fogging film provided on a surface of the window plate, the surface facing a vehicle interior. The vehicle windshield includes a first region and a second region within a see-through region. The anti-fogging film is not provided in the first region as viewed in a front view, and the anti-fogging film is provided in the second region as viewed in the front view. The first region includes a belt-like region in an upper portion of the see-through region. The second region is a region that includes at least a test area B defined in JIS R3212 (1998) and that includes a continuous projection portion provided on an upper side. The anti-fogging film in the second region has a minimum film thickness of no less than 5 μm. At least a boundary between the first region and the second region excluding the projection portion has no perspective distortion and is formed by a boundary line having a linewidth of 10-200 μm, the boundary line being visually recognized by scattering of incoming light.

The article for a vehicle according to the present invention includes the vehicle windshield according to the above invention and an optical device attached on a vehicle interior side of the vehicle windshield within the first region and in the vicinity of an outer side of the projection portion of the second region. The optical device is configured to transmit a signal to a vehicle exterior side of the vehicle windshield through the projection portion of the second region and/or to receive a signal from the vehicle exterior side of the vehicle windshield through the projection portion of the second region.

Advantageous Effects of Invention

The present invention can provide a vehicle windshield provided with an anti-fogging film in which, when an optical device is attached to the vehicle windshield, the optical device is bonded with high bonding strength and sufficient anti-fogging performance is exhibited in a sensing region of the optical device and can provide an article for a vehicle having such a vehicle windshield and an optical device.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of a vehicle windshield according to the present invention will be described with reference to the drawings.

In the present specification, the expressions "upper" and "lower" refer to, respectively, the upper side and the lower side of a vehicle windshield held when the vehicle windshield is installed in a vehicle. An "upper portion" of the vehicle windshield refers to the upper portion of the vehicle windshield held when the vehicle windshield is installed in a vehicle, and a "lower portion" of the vehicle windshield refers to the lower portion of the vehicle windshield held when the vehicle windshield is installed in a vehicle.

In the present specification, a peripheral portion of the vehicle windshield refers to an outer peripheral region of the vehicle windshield, and this outer peripheral region has a certain width extending from the outer periphery toward a center portion of a principal surface of the vehicle windshield. In the present specification, the side toward the outer periphery relative to the center portion on the principal surface of the vehicle windshield is referred to an outer side, and the side toward the center portion relative to the outer periphery is referred to as an inner side. With regard to the expression "substantially," in the present specification, the expression "substantially center," for example, is to be understood to be a center as determined by human visual perception. In other cases as well, the expression "substantially" has a meaning similar to the above. In the present specification, a symbol "-" indicating a numerical range means that the range includes the upper and lower limits.

In the present specification, the expression "a side X of a predetermined region has a projection portion" means that at least a continuous portion on each side of the projection portion on the side X is located on an inner side of the predetermined region than the position of the most projecting portion of the projection portion (the most projecting point is referred to as a vertex of the projection portion). In a similar manner, the expression "a side X of a predetermined region has a recess portion" means that at least a continuous portion on each side of the recess portion on the side X is located on an outer side of the predetermined region than the position of the most recessed portion of the recess portion. In the present specification, a base portion of a recess portion corresponds to a position where the recess portion starts being recessed. In a similar manner, a base portion of a projection portion refers to a position where the projection portion starts projecting.

Figure 1:
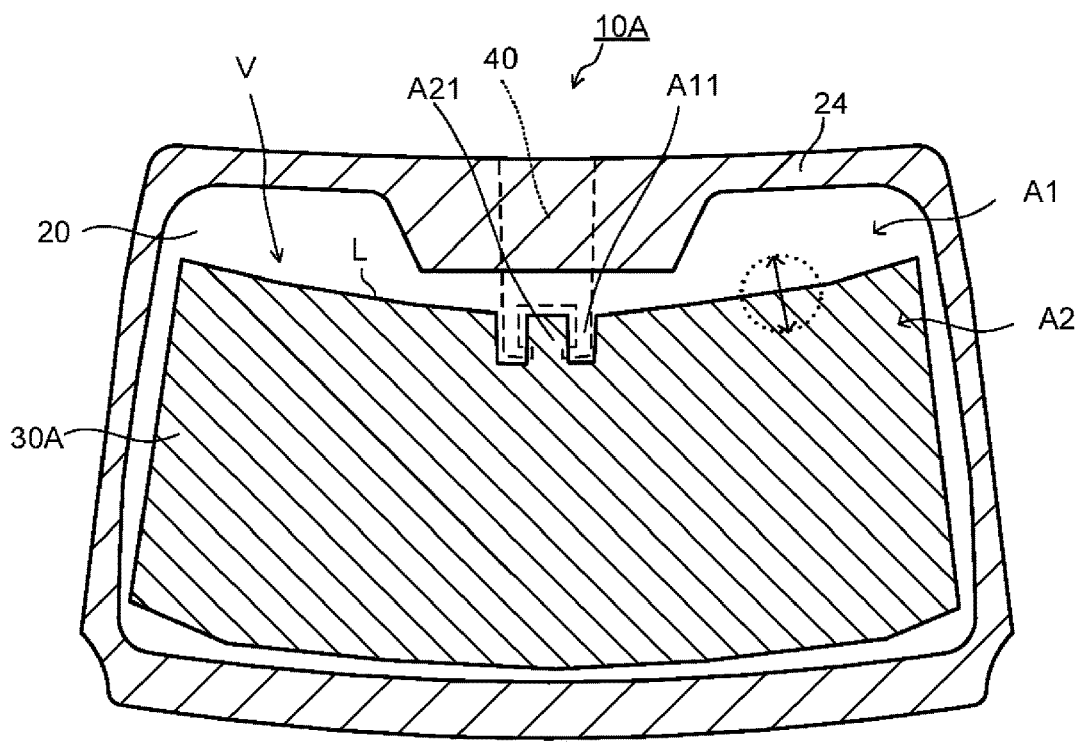
FIG. 1 is a configuration diagram of an example of an embodiment of a vehicle windshield according to the present invention.
Figure 2:
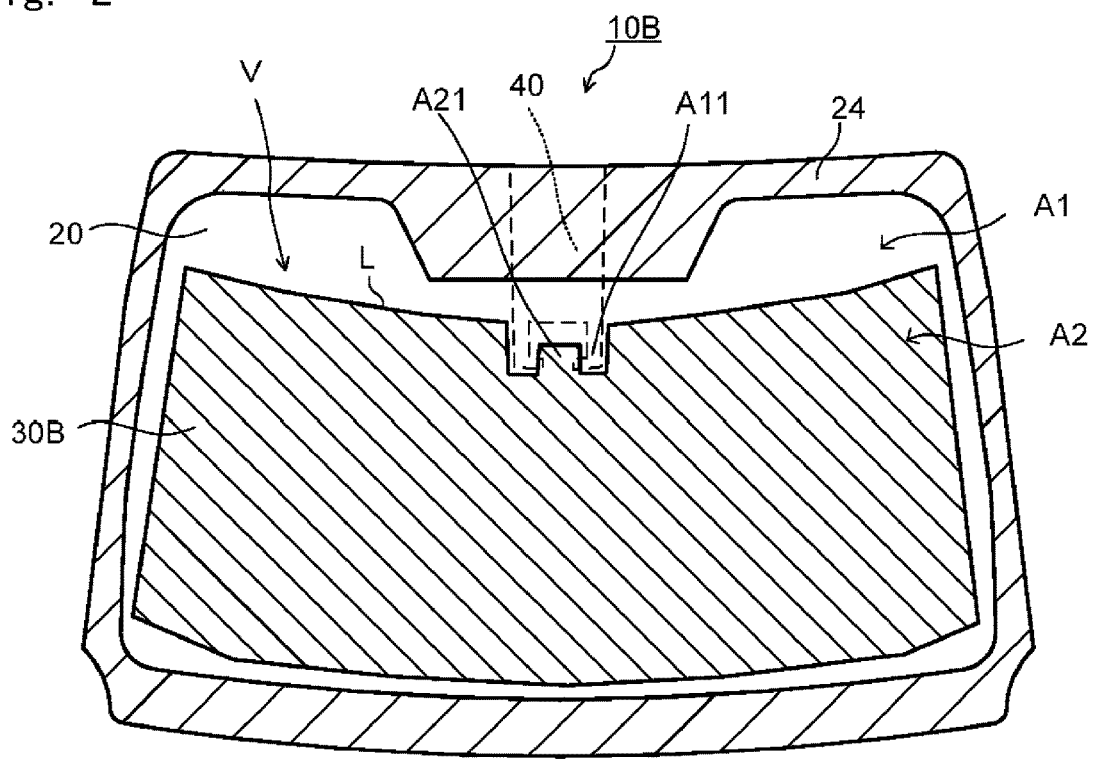
FIG. 2 is a configuration diagram of another example of an embodiment of a vehicle windshield according to the present invention.
Figure 3:
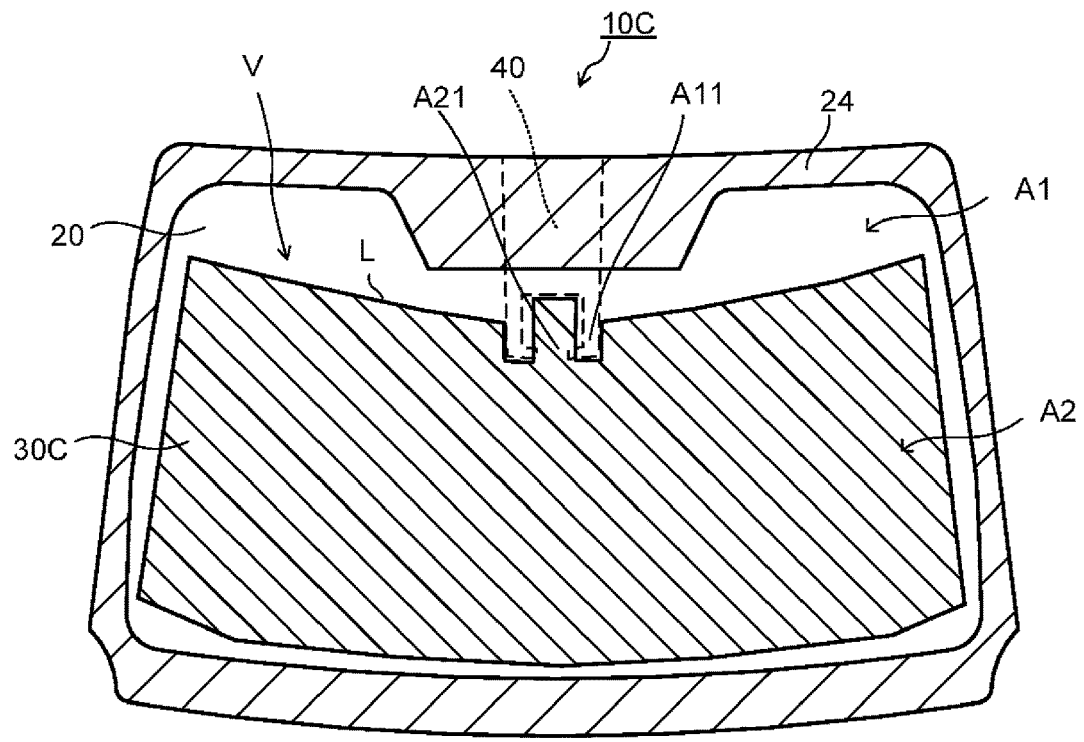
FIG. 3 is a configuration diagram of another example of an embodiment of a vehicle windshield according to the present invention.
Figure 4:
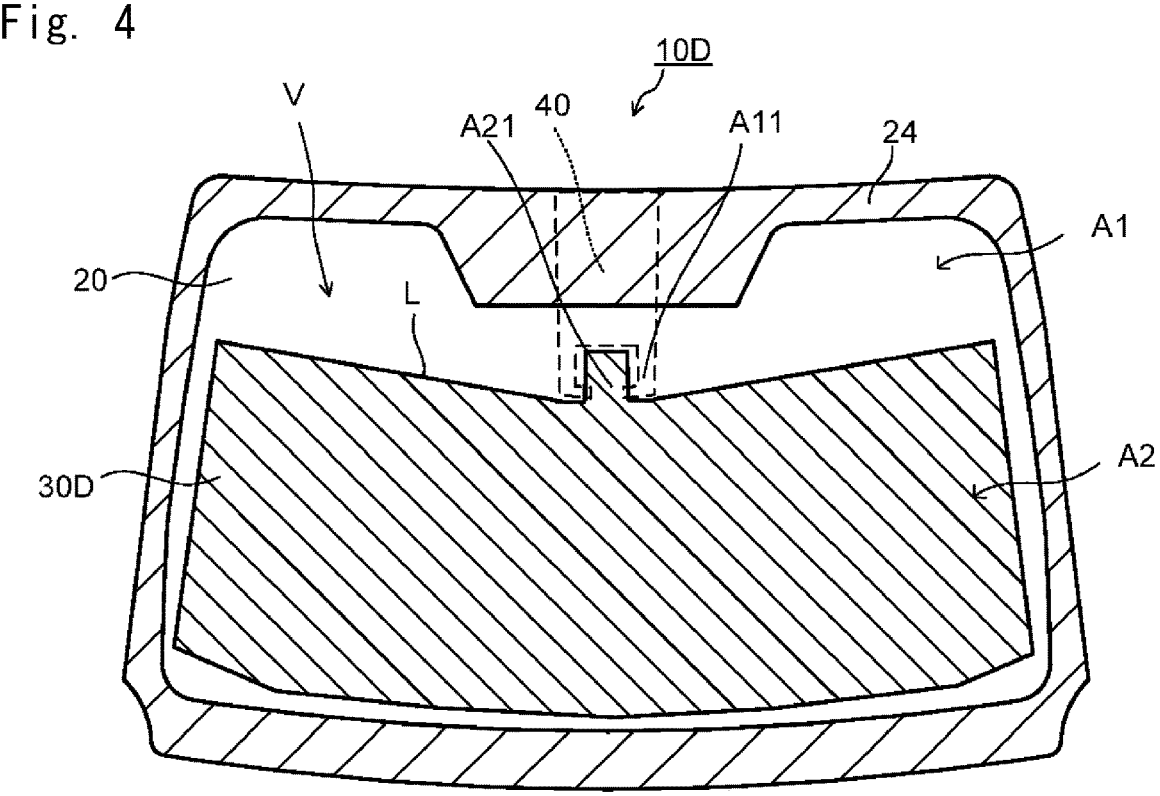
FIG. 4 is a configuration diagram of another example of an embodiment of a vehicle windshield according to the present invention.
Figure 5:
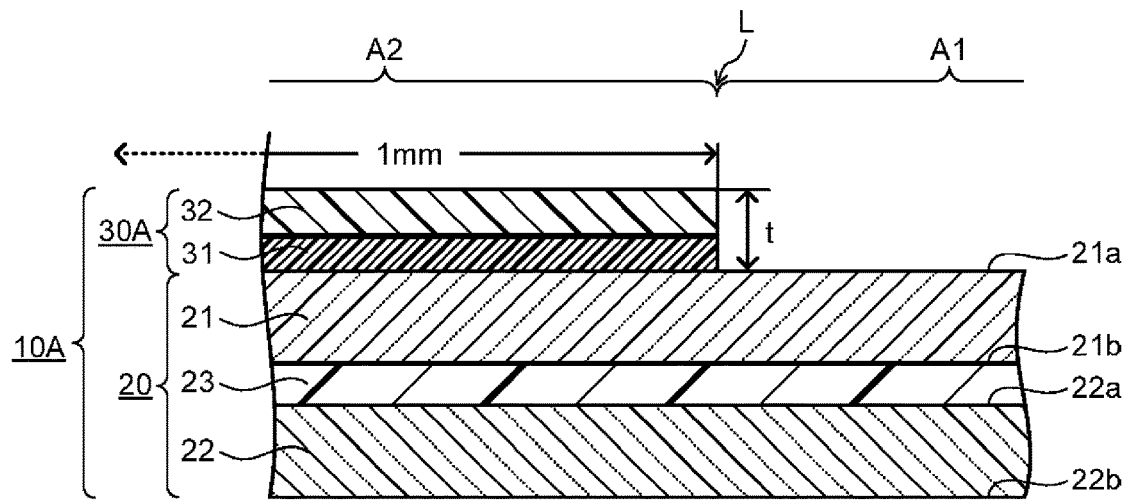
FIG. 5 is an enlarged sectional view of the vehicle windshield illustrated in FIG. 1, taken in the vicinity of a boundary line L.

FIG. 1 is a configuration diagram of an example of an embodiment of a vehicle windshield according to the present invention. FIGS. 2 to 4 are configuration diagrams of examples, which are each different from the example of FIG. 1, of embodiments of vehicle windshields according to the present invention. FIGS. 1 to 4 are each a front view of the vehicle windshield according to the respective embodiments. In the descriptions made with reference to FIGS. 1 to 4, the shapes of regions are all shapes as viewed in the front view. FIG. 5 is an enlarged sectional view of the vehicle windshield illustrated in FIG. 1, taken in the vicinity of a boundary line (i.e., an enlarged sectional view taken along a plane extending in the direction of the double-headed arrow within the dotted circle indicated in FIG. 1).

A vehicle windshield 10A illustrated in FIG. 1 includes a window plate 20 and an anti-fogging film 30A provided on a surface of the window plate 20 on a vehicle interior side. The window plate 20 is provided with a black ceramic layer 24. The black ceramic layer 24 is a belt-like layer formed throughout a peripheral portion of the window plate 20.

In the vehicle windshield 10A, a region where the black ceramic layer 24 is formed is a shading region. In the vehicle windshield 10A, a see-through region V is a region excluding, from the entire region of the window plate 20, the region where the black ceramic layer 24 is formed.

The anti-fogging film 30A generally has a substantially trapezoidal shape having a continuous projection portion A21 provided on its upper side. The anti-fogging film 30A is provided in the vehicle windshield 10A except in a belt-like portion in the peripheral portion of the see-through region V. In the vehicle windshield 10A, the region where the anti-fogging film 30A is formed coincides with a second region A2, and the second region A2 is a region where the anti-fogging film is formed within the viewing region V. In the vehicle windshield 10A, the upper side of the second region A2 is shaped, more specifically, to have a recess portion where a substantially center portion of the upper side is recessed downward. The projection portion A21 is so formed as to project upward from a bottom portion of this recess portion. The vertex of the projection portion A21 is at a position level with a base portion of the recess portion on the upper side.

In the vehicle windshield 10A, the second region A2 includes at least a test area B defined in JIS R3212 (1998) (not illustrated, hereinafter, also referred to simply as "the test area B"). The anti-fogging film 30A in the second region A2 has a minimum film thickness of no less than 5 μm.

The anti-fogging film 30A has a function of preventing fogging of the vehicle windshield in a high-humidity environment to secure the driver's field of view. The second region A2, where the anti-fogging film 30A is formed, includes the test area B serving as a viewing area of the vehicle driver. The test area B is a test area defined as "the test area of safety glass used in the front side" specified in JIS R3212 ("the automobile safety glass test method," 1998). In the anti-fogging film 30A, as the second region A2 includes the test area B and as the minimum film thickness in the second region A2 is no less than 5 high anti-fogging functionality is exhibited in a high-humidity environment, making it possible to secure a sufficient field of view for the driver.

The second region A2 has the same shape as the anti-fogging film 30A described above as viewed in the front view. Specifically, the second region A2 is provided continuously and generally has a substantially trapezoidal shape with the projection portion A21 provided on its upper side. The projection portion A21 is a region provided for an optical device, which is attached on the vehicle interior side of the vehicle windshield. This optical device transmits a signal to the outside of the vehicle through the vehicle windshield and/or receives a signal from the outside of the vehicle. An optical device 40 obtained when such an optical device is attached to the vehicle interior side of the vehicle windshield 10A is indicated by the dashed line in FIG. 1. The optical device 40 typically includes an optical member for transmitting and/or receiving the aforementioned signal, a bracket for supporting the optical member and fixing the optical member to the vehicle windshield, and a housing covering the optical member and the bracket.

When the optical device 40 is to be attached to the vehicle windshield 10A, the optical device 40 is attached such that the optical member is disposed at a position where the optical member can transmit and/or receive a signal through the projection portion A21 of the second region A2 in the vehicle windshield 10A. As described above, the minimum film thickness of the anti-fogging film 30A in the second region A2 is no less than 5 µm, and the film thickness that allows for a sufficient level of anti-fogging performance is ensured in the projection portion A21 as well. As the optical member transmits and/or receives a signal through the projection portion A21, the signal can be transmitted and/or received stably and reliability without being affected by fogging in a high-humidity environment.

The optical device 40 is attached to the vehicle windshield 10A with the bracket. The bracket is attached to an attachment region A11, serving as a first region, present on each side of the projection portion A21. In the vehicle windshield 10A, the attachment region A11 is a region between the sides of the recess portion recessed from the upper side of the second region and the sides of the projection portion A21 so formed as to project upward from the bottom portion of this recess portion. The attachment region A11 is present on each side of the projection portion A21 and has a predetermined width. In the vehicle windshield 10A, the first region is provided mainly to secure the attachment region A11 where the bracket of the optical device 40 is attached. Since the first region does not include the anti-fogging film 30A, the bracket can be attached to the attachment region A11 included in the first region with sufficient bonding strength through an ordinary method.

In the vehicle windshield according to the embodiment, since the first region includes the region where the optical device is attached, the first region is formed into a shape that includes at least a belt-like region in the upper portion of the see-through region. In the vehicle windshield 10A illustrated in FIG. 1, a region within the see-through region V excluding the second region A2 is a first region A1 where no anti-fogging film is formed, and the first region A1 has a frame-like shape including the belt-like region in the upper portion of the see-through region V and enclosing the second region A2.

The positions, the dimensions, the shapes, and so on of the projection portion A21 of the second region A2 and the attachment region A11 that is present at each side of the projection portion A21 and that serves as the first region A1 are adjusted as appropriate in accordance with the type and/or the dimensions of an optical device to be used in combination.

For example, there is no particular limitation on the shape and/or the dimensions of the projection portion as long as the projection portion is shaped and/or dimensioned such that the optical member included in the optical device to be used can transmit and/or receive a signal through the projection portion. From the viewpoint of processability of the anti-fogging film, the projection portion preferably has a rectangular shape, as in the projection portion A21 of the second region A2 in the vehicle windshield 10A illustrated in FIG. 1. When the distance from a bottom side connecting the two base portions on the respective sides of the projection portion to the most projecting position of the projection portion is regarded as a height h of the projection portion, the height h of the projection portion is preferably 5-150 mm. In addition, when the length of the bottom side of the projection portion is regarded as a width w of the projection portion, the width w of the projection portion is preferably 5-200 mm.

In the vehicle windshield 10A, as the projection portion A21 of the second region A2 has the above-described dimensions, when the optical device to be used is a sensor, for example, the aforementioned dimensions are preferable in that the projection portion A21 can be designed more compactly. When the projection portion has a rectangular shape, the width w of the projection portion is constant from the bottom side to the most projecting portion of the projection portion.

In the vehicle windshield, the two base portions of the projection portion may not be level with each other in the height wise direction of the projection portion (hereinafter, referred to as the "height wise position") but are preferably level with each other from the viewpoint of ease of attaching the optical device. When the height wise positions of the two base portions of the projection portion differ from each other, the height h of the projection portion is the distance from a mean height wise position of the two base portions to the most projecting portion of the projection portion. Furthermore, the width w of the projection portion is the width of the projection portion at a mean height wise position of the two base portions.

In the vehicle windshield 10A, it suffices that the attachment region A11 located on each side of the projection portion A21 be dimensioned such that at least the bracket of the optical device to be used can be attached to the attachment region A11. As long as the attachment region A11 has a width of no less than approximately 3 mm, a bracket of an optical device typically used can be attached to the attachment region A11. This width is more preferably no less than 5 mm. In the vehicle windshield 10A, from the viewpoint of securing a large area for the second region (anti-fogging region), the width of the attachment region A11 is preferably no more than approximately 40 mm or more preferably no more than 30 mm. When the distance from the base portion of the recess portion to the bottom portion of the recess portion is regarded as a depth d of the recess portion, the depth d of the recess portion is equal to the height h of the projection portion A21. The attachment region A11 may extend further than the depth d of the recess portion and may extend upward beyond the base portion of the recess portion on the upper side of the second region.

In the vehicle windshield 10A according to the present embodiment, the anti-fogging film 30A includes the projection portion A21 on the upper side and includes a main portion that extends continuously from and below the projection portion A21 and that spans a broad area including the test area B. Therefore, as compared to a case in which, for example, an island-like anti-fogging film having a small area is provided in a region corresponding to the projection portion of the anti-fogging film 30A and an anti-fogging film having a large area corresponding to the main portion of the anti-fogging film 30A is provided below the island-like anti-fogging film with a gap provided therebetween, higher anti-fogging performance can be obtained in the projection portion A21 in a boundary region that borders the main portion. This is because fogging starts in the first region where no anti-fogging film is provided and extends to the outer periphery of the anti-fogging film that is in contact with the first region. In the vehicle windshield according to the present embodiment, the anti-fogging film is so provided as to allow the region in front of the optical device (corresponding to the projection portion A21) and the broad region therebelow including the test area B (corresponding to the main portion) to be continuous with each other, as in the anti-fogging film 30A. Thus, the region in front of the optical device is made less likely fog up, and malfunctioning can be suppressed effectively.

In order to obtain the projection portion A21 and the attachment region A11 in a manner described above while ensuring that the visible region V includes the second region A2 as a region normally used by the driver as a viewing area, the width of the belt-like region in the upper portion of the first region A1 is, for example, preferably 5-300 mm or more preferably 50-250 mm. The width of the belt-like region in the upper portion of the first region A1 may vary along the widthwise direction of the vehicle.

For example, in the vehicle windshield 10A, the black ceramic layer 24 has a greater width at a center portion on the upper side in order to conceal the portion where various articles including the optical device are attached and has a smaller width in the remaining portion. In such a case, as the width of the belt-like region in the upper portion of the first region A1 is set smaller at the center portion and set greater at the remaining portion, the lower side of the belt-like region in the upper portion of the first region A1 can be positioned at substantially the same height except at the attachment region A11. This configuration makes it possible to ensure that the visible region V includes the second region A2 as a region normally used by the driver as a viewing area, more specifically, to ensure that the visible region V includes the test area B.

The first region A1 provided in this manner can be used not only to secure the attachment region A11 for the optical device but also to, for example, affix stickers, such as a vehicle inspection certificate or a vehicle inspection seal, directly onto the surface of the window plate 20 on the vehicle interior side and to dispose an on-board antenna or the like as well as to inform the driver of the vehicle of the timing to start using a defogger since the first region A1 fogs up more easily than the second region A2.

The region other than the belt-like region in the upper portion of the first region A1, that is, the region that extends along the lower side and the right and left sides of the second region A2 and that is present between the inner periphery of the black ceramic layer 24 and the outer periphery of the second region A2 is not an essential region. There is no particular limitation on the widths of these regions in the first region A1 as long as the second region A2 can be so set as to include the test area B. The widths of the aforementioned regions can be, for example, 5-50 mm or more preferably 5-30 mm.

Thus far, referring to the vehicle windshield 10A illustrated in FIG. 1, the shapes of the second region and the first region in the see-through region as viewed in the front view have been described. The shapes of the second region and the first region are not limited to those described above and may be like, for example, the shapes in vehicle windshields 10B to 10D illustrated in FIGS. 2 to 4, respectively. The vehicle windshields 10B to 10D illustrated in FIGS. 2 to 4 are similar to the vehicle windshield 10A illustrated in FIG. 1 except that the shape of the upper side including the projection portion of the second region is different.

The vehicle windshield 10B illustrated in FIG. 2 includes the window plate 20 and an anti-fogging film 30B provided on a surface of the window plate 20 on the vehicle interior side. The window plate 20 includes the black ceramic layer 24. The black ceramic layer 24 is a belt-like layer formed throughout the peripheral portion of the window plate 20. In the vehicle windshield 10B, the region where the black ceramic layer 24 is formed is the shading region, and the see-through region V is a region excluding, from the entire region of the window plate 20, the region where the black ceramic layer 24 is formed.

The anti-fogging film 30B generally has a substantially trapezoidal shape having a continuous projection portion A21 provided on its upper side. The anti-fogging film 30B is provided in the vehicle windshield 10B except in a belt-like portion in the peripheral portion of the see-through region V. In the vehicle windshield 10B, the region where the anti-fogging film 30B is formed coincides with the second region A2, and the second region A2 is a region where the anti-fogging film is formed within the viewing region V. In the vehicle windshield 10B, the upper side of the second region A2 is shaped, more specifically, to have a recess portion where a substantially center portion of the upper side is recessed downward. The projection portion A21 is so formed as to project upward from a bottom portion of this recess portion. The vertex of the projection portion A21 is at a position lower than a base portion of the recess portion on the upper side. As long as the upper side of the second region has a shape such as the one in the vehicle windshield 10B, a broad region where no anti-fogging film is formed is disposed in the vicinity of the position where the bracket of the optical device is attached. This configuration is preferable in that the optical device can be bonded more reliably and the bonding strength can be improved.

In the vehicle windshield 10B, the height h of the projection portion A21 is preferably 5-100 mm. The width w of the projection portion A21 is preferably 5-200 mm.

In the vehicle windshield 10B, the attachment region A11 located at each side of the projection portion A21 can have a width similar to that in the case of the vehicle windshield 10A. The depth d of the recess portion is preferably 5-150 mm. The difference between the height h of the projection portion A21 and the depth d of the recess portion is preferably 5-50 mm.

In the vehicle windshield 10B according to the present embodiment, the anti-fogging film 30B includes the projection portion A21 on the upper side and includes a main portion that extends continuously from and below the projection portion A21 and that spans a broad area including the test area B. Therefore, in the vehicle windshield 10B as well, as in the vehicle windshield 10A, advantageous effects of making the region in front of the optical device less likely to fog up and effectively suppressing malfunctioning can be expected.

The vehicle windshield 10C illustrated in FIG. 3 includes the window plate 20 and an anti-fogging film 30C provided on a surface of the window plate 20 on the vehicle interior side. The window plate 20 includes the black ceramic layer 24. The black ceramic layer 24 is a belt-like layer formed throughout the peripheral portion of the window plate 20. In the vehicle windshield 10C, the region where the black ceramic layer 24 is formed is the shading region, and the see-through region V is a region excluding, from the entire region of the window plate 20, the region where the black ceramic layer 24 is formed.

The anti-fogging film 30C generally has a substantially trapezoidal shape having a continuous projection portion A21 provided on its upper side. The anti-fogging film 30C is provided in the vehicle windshield 10C except in a belt-like portion in the peripheral portion of the see-through region V. In the vehicle windshield 10C, the region where the anti-fogging film 30C is formed coincides with the second region A2, and the second region A2 is a region where the anti-fogging film is formed within the viewing region V. In the vehicle windshield 10C, the upper side of the second region A2 is shaped, more specifically, to have a recess portion where a substantially center portion of the upper side is recessed downward. The projection portion A21 is so formed as to project upward from a bottom portion of this recess portion. The vertex of the projection portion A21 is at a position higher than a base portion of the recess portion on the upper side. As long as the upper side of the second region has a shape such as the one in the vehicle windshield 10C, a large projection portion A21, which is the region in front of the optical device, can be formed while securing a large area for the anti-fogging film within the viewing region, and thus this configuration is preferable.

In the vehicle windshield 10C, the height h of the projection portion A21 is preferably 5-200 mm. The width w of the projection portion A21 is preferably 5-200 mm.

In the vehicle windshield 10C, the attachment region A11 located at each side of the projection portion A21 can have a width similar to that in the case of the vehicle windshield 10A. The depth d of the recess portion is preferably 5-150 mm. The difference between the height h of the projection portion A21 and the depth d of the recess portion is preferably 5-50 mm.

In the vehicle windshield 10C according to the present embodiment, the anti-fogging film 30C includes the projection portion A21 on the upper side and includes a main portion that extends continuously from and below the projection portion A21 and that spans a broad area including the test area B. Therefore, in the vehicle windshield 10C as well, as in the vehicle windshield 10A, advantageous effects of making the region in front of the optical device less likely to fog up and effectively suppressing malfunctioning can be expected.

The vehicle windshield 10D illustrated in FIG. 4 includes the window plate 20 and an anti-fogging film 30D provided on a surface of the window plate 20 on the vehicle interior side. The window plate 20 includes the black ceramic layer 24. The black ceramic layer 24 is a belt-like layer formed throughout the peripheral portion of the window plate 20. In the vehicle windshield 10D, the region where the black ceramic layer 24 is formed is the shading region, and the see-through region V is a region excluding, from the entire region of the window plate 20, the region where the black ceramic layer 24 is formed.

The anti-fogging film 30D generally has a substantially trapezoidal shape having a continuous projection portion A21 provided on its upper side. The anti-fogging film 30D is provided in the vehicle windshield 10D except in a belt-like portion in the peripheral portion of the see-through region V. In the vehicle windshield 10D, the region where the anti-fogging film 30D is formed coincides with the second region A2, and the second region A2 is a region where the anti-fogging film is formed within the viewing region V. In the vehicle windshield 10D, the upper side of the second region A2 is shaped, more specifically, to have the projection portion A21 at a substantially center portion of the upper side, and only the projection portion A21 projects upward relative to the portion other than the projection portion A21. As long as the upper side of the second region has a shape such as the one in the vehicle windshield 10D, this shape is preferable in that the broadest first region A1 can be easily secured.

In the vehicle windshield 10D, the height h of the projection portion A21 is preferably 5-150 mm, for example. The width w of the projection portion A21 is preferably 5-200 mm. In the vehicle windshield 10D, there is no particular limitation on the widthwise configuration of the attachment region A11 located on each side of the projection portion A21 since the upper side of the second region A2 includes no portion projecting upward other than the projection portion A21.

In the vehicle windshield 10D according to the present embodiment, the anti-fogging film 30D includes the projection portion A21 on the upper side and includes a main portion that extends continuously from and below the projection portion A21 and that spans a broad area including the test area B. Therefore, in the vehicle windshield 10D as well, as in the vehicle windshield 10A, advantageous effects of making the region in front of the optical device less likely to fog up and effectively suppressing malfunctioning can be expected.

With regard to the vehicle windshields 10A to 10D illustrated in FIGS. 1 to 4, the second region and the first region have been described with the description centered on the projection portion A21 on the upper side of the second region and the attachment region A11 present on each side of the projection portion A21 and serving the first region. In the vehicle windshields 10A to 10D, the position, in the widthwise direction of the vehicle, of the projection portion on the upper side of the second region is at substantially the center in the widthwise direction of the vehicle, but the vehicle windshield according to the present invention is not limited thereto. The position, in the widthwise direction of the vehicle, of the projection portion on the upper side of the second region can be selected as appropriate in accordance with the optical device to be used. Typically, along a stretch from the center of the vehicle windshield in the widthwise direction of the vehicle to each end portion in the widthwise direction of the vehicle, the projection portion is provided at a position that is within approximately one-third the distance from the center to each end portion in the widthwise direction of the vehicle.

In the vehicle windshield according to the present invention, from the viewpoint of design sophistication, it is preferable that a portion other than the projection portion on the upper side of the second region be formed into a shape that conforms to the shape of the upper side of the window plate. Specifically, a boundary line L (its characteristics will be described later) constituting the upper side excluding the projection portion is preferably so formed as to be substantially parallel to the upper side of the window plate and so formed as to have a curvature substantially equal to the curvature of the curved shape (the shape recessed downward) of the upper side of the window plate. Alternatively, the boundary line L constituting the upper side of the second region excluding the projection portion may be so formed as to substantially follow along the upper side of the window plate such that the distance between the upper side of the window plate and the boundary line L gradually decreases in the direction from the center toward each end portion in the widthwise direction of the vehicle.

As illustrated in FIGS. 1 to 4, the boundary between the first region and the second region is constituted by the boundary line L that coincides with the outer periphery of the second region. The boundary line L is a boundary line L having a feature of the present invention. Specifically, the boundary line L has no perspective distortion at a boundary of the aforementioned two regions divided by this boundary line, and the boundary line L has a linewidth of 10-200 μm, that is visually recognized by scattering of incoming light.

In the vehicle windshields 10A to 10D, as the boundary between the projection portion A21 and the attachment region A11 is constituted by the boundary line L having no perspective distortion, the optical member can transmit and/or receive a signal stably and reliability without being affected by the perspective distortion. In addition, as the boundary between the projection portion A21 and the attachment region A11 is formed by the boundary line L having a linewidth of 10-200 μm, that is visually recognized by scattering of incoming light, the boundary can be visually recognized with ease, and the optical device can be installed at an appropriate position. As long as the linewidth of the boundary line L is 10-200 μm, there is almost no influence on the transmission and/or the reception of a signal by the optical member.

As the boundary line can be visually recognized as a boundary, the ease of operation in installing stickers and/or an on-board antenna in the first region improves. Furthermore, there is no interference with the driving field of view in association with perspective distortion on the boundary line, and as long as the linewidth of the boundary line L is 10-200 μm, there is almost no influence on the driving field of view.

In the present specification, the presence of perspective distortion caused by the boundary line, that is, the presence of perspective distortion on the boundary between the two regions divided by the boundary line is evaluated as described below, and the linewidth of the boundary line that is visually recognized upon incoming light being scattered thereby is measured as described below. The linewidth of the boundary line as used in the present specification refers to the linewidth on the boundary line between the second region and the first region as measured in the method described below, unless specifically indicated otherwise.

(Presence of Perspective Distortion)

Prepared is a test plate A on which a grid pattern of black lines disposed at an interval of 10 mm and each having a width of 0.7 mm is formed on a white background such that each black line is at an angle of 45 degrees relative to the lower side. This test plate A and a vehicle windshield are disposed such that the surface of the test plate A on which the grid pattern is formed and the surface of the vehicle windshield on which no anti-fogging film is formed are spaced apart by 20 mm from each other and are parallel to each other. With a camera installed at a distance of 150 mm from the surface of the vehicle windshield on which the anti-fogging film is formed, an image of the surface of the test plate A on which the grid pattern is formed is captured through the vehicle windshield such that the boundary line between the second region and the first region is located at substantially the center of the imaging area. The obtained image is visually inspected. In a case in which a deformation or a break is observed in the grid pattern, this case is denoted as "perspective distortion is present." In a case in which neither a deformation nor a break is observed, this case is denoted as "no perspective distortion is present."

(Linewidth of Boundary Line)

A test plate B having an entirely black principal surface is prepared. This test plate B and a vehicle windshield are disposed such that the black surface of the test plate B and the surface of the vehicle windshield on which no anti-fogging film is formed are spaced apart by 20 mm from each other and are parallel to each other. With a camera installed at a distance of 150 mm from the surface of the vehicle windshield on which the anti-fogging film is formed, while a space between the test plate B and the vehicle windshield is being irradiated with visible light, an image of the black surface of the test plate B is captured through the vehicle windshield such that the boundary line between the second region and the first region is located at substantially the center of the imaging area. The obtained image is magnified by 5×, a maximum linewidth along a 100-mm stretch of the boundary line is measured, and the obtained maximum linewidth serves as the linewidth of the boundary line.

In the vehicle windshield according to the present invention, the linewidth of the boundary line L is 10-200 μm. As long as the linewidth of the boundary line L is within this range, the boundary line L can be recognized visually as a boundary at a sufficient level, and the boundary line L has almost no influence on the driving field of view or on the transmission and/or the reception of a signal by the optical member. In addition, the boundary line L provides design sophistication as it can be visually recognized as an aesthetic line by human perception. The linewidth of the boundary line L is preferably 10-150 μm.

The linewidth of the boundary line L in the see-through region V may vary depending on the position within the aforementioned predetermined range according to the present invention. In addition, the boundary line L may have a rounded shape in which corners of the projection portion of the anti-fogging film are rounded. The boundary line L having a rounded shape is preferable since the anti-fogging film peels off less easily. The projection portion of the anti-fogging film is covered by the optical device, and thus not much attention needs to be paid to the appearance of the projection portion. Accordingly, the boundary line between the projection portion of the anti-fogging film and the first region may or may not have the feature of the boundary line L described above.

The above-described feature of the boundary line L, that is, the feature that the boundary line L has no perspective distortion and has a linewidth of 10-200 μm that is visually recognized by scattering of incoming light will be described with reference to FIG. 5, which illustrates a sectional shape on the boundary line L. FIG. 5 is an enlarged sectional view of the vehicle windshield illustrated in FIG. 1, taken in the vicinity of the boundary line L (i.e., an enlarged sectional view taken perpendicularly along a plane extending in the direction of the double-headed arrow (the direction orthogonal to the boundary line L) within the dotted circle indicated in FIG. 1).

In FIG. 5, the anti-fogging film 30A has a two-layer structure including a ground layer 31 located on the side closer to the window plate 20 and an upper layer 32 overlying the ground layer 31 and having anti-fogging functionality. The window plate 20 has a configuration that includes two light-transmissive substrates 21 and 22 sandwiching an intermediate film 23.

In FIG. 5, the anti-fogging film 30A formed on the principal surface of the window plate 20 on the vehicle interior side has a film thickness t that is substantially constant in the vicinity of the boundary line L, and the shape of an end surface of the anti-fogging film 30A is substantially perpendicular to the principal surface of the window plate 20. That the film thickness t of the anti-fogging film 30A is substantially constant in the vicinity of the boundary line L specifically means the following. In a captured image of a section of the vehicle windshield 10A cut along a plane orthogonal to the boundary line L, similar to the one illustrated in FIG. 5, a maximum value of the film thickness within a 1-mm range inward from the end surface (at the position of the boundary line L) of the anti-fogging film 30A is regarded as 100%. Then, a value (%) obtained by subtracting, from 100%, the percentage (%) of a minimum value relative to the maximum value is no more than 5%. This value (%) is preferably no more than 2% or more preferably no more than 1%. Hereinafter, the value (%) obtained by subtracting, from 100%, the percentage (%) of the minimum value relative to the maximum value (100%) of the film thickness of the anti-fogging film within a 1-mm range inward from the position of the boundary line L as measured through the foregoing method is referred to as "a deviation of the film thickness at the end portion" of the anti-fogging film. The sectional view illustrated in FIG. 5 is a schematic diagram, and FIG. 5 does not exactly depict the actual shape of the end surface of the anti-fogging film 30A, for example.

In the vehicle windshield 10A, as the anti-fogging film 30A is provided on the window plate 20 in a manner illustrated in FIG. 5, for example, the boundary line L between the first region A1 and the second region A2 can result in the boundary line L having no perspective distortion at the boundary between the aforementioned two regions divided by this boundary line and having a linewidth of 10-200 μm that is visually recognized by scattering of incoming light. A method of so forming the anti-fogging film 30A as to have the above-described shape will be described later.

The sectional view illustrated in FIG. 5 is a sectional view of the vehicle windshield 10A taken in the vicinity of the boundary line L. The layered structure of the window plate 20 is similar to the one illustrated in FIG. 5 throughout the vehicle windshield 10A. The layered structure of the anti-fogging film 30A is similar to the one illustrated in FIG. 5 throughout the anti-fogging film 30A. Hereinafter, each member constituting the vehicle windshield 10A will be described.

The window plate 20 includes the first light-transmissive substrate 21, the second light-transmissive substrate 22 opposing the first light-transmissive substrate 21, and the intermediate film 23 sandwiched by the first light-transmissive substrate 21 and the second light-transmissive substrate 22 and bonding the first light-transmissive substrate 21 and the second light-transmissive substrate 22 together.

The first light-transmissive substrate 21 is provided closer than the second light-transmissive substrate 22 to the interior of the vehicle. A surface 21a of the first light-transmissive substrate 21 on the vehicle interior side is referred to as a first surface. An opposing surface 21b of the first light-transmissive substrate 21 that opposes the second light-transmissive substrate 22 is referred to as a second surface.

The second light-transmissive substrate 22 is provided closer than the first light-transmissive substrate 21 to the exterior of the vehicle. An opposing surface 22a of the second light-transmissive substrate 22 that opposes the first light-transmissive substrate 21 is referred to as a third surface. A surface 22b of the second light-transmissive substrate 22 on the vehicle exterior side is referred to as a fourth surface.

The first surface 21a, the second surface 21b, the third surface 22a, and the fourth surface 22b are arranged in this order in the window plate 20 from the vehicle interior side to the vehicle exterior side.

The first light-transmissive substrate 21 and the second light-transmissive substrate 22 are each composed of glass or plastics. The first light-transmissive substrate 21 and the second light-transmissive substrate 22 may both be composed of glass or may both be composed of plastics. Alternatively, either one of the first light-transmissive substrate 21 and the second light-transmissive substrate 22 may be composed of glass, and the other one of them may be composed of plastics. Examples of the glass composing the light-transmissive substrate(s) include soda-lime glass, borosilicate glass, non-alkali glass, and silica glass. Examples of the plastics forming the light-transmissive substrate(s) include an acryl-based resin, such as polymethyl methacrylate; an aromatic polycarbonate-based resin, such as polyphenylene carbonate; and an aromatic polyester-based resin, such as polyethylene terephthalate (PET).

In the vehicle windshield 10A, the window plate 20 has a configuration in which the two light-transmissive substrates sandwich the intermediate film. The number of light-transmissive substrates constituting the window plate, however, may be one or three or more. When the number of light-transmissive substrates is three or more, it is essential that an intermediate film be provided between every light-transmissive substrate.

For the window plate 20, a window plate having a principal surface that is substantially trapezoidal can be used. In addition, for the window plate 20, a window plate that has been so formed as to be bent in a desired curved shape required for a vehicle windshield can be used. Specifically, the window plate 20 may have a curvature shape in which the two end portions in the widthwise direction of the vehicle held when the window plate 20 is installed in a vehicle are located closer, than the center portion, to the rear of the vehicle. In other words, the window plate 20 may be curved in a state in which the center portion in the widthwise direction of the vehicle projects frontward of the vehicle. In addition, the window plate 20 may have a curvature shape in which the center portion on the upper side in the widthwise direction of the vehicle is located lower than the two end portions of the upper side. In other words, the shape of the upper side of the window plate 20 may be curved such that the center portion in the widthwise direction of the vehicle sags the most downward. The window plate 20 has a thickness of approximately 1-10 mm, for example. The shape, the thickness, and so on of the window plate 20 are designed as appropriate in accordance with the vehicle in which the window plate 20 is installed.

The belt width of the belt-like black ceramic layer 24 formed throughout the peripheral portion of the window plate 20 is preferably in a range of 5-300 mm or more preferably in a range of 10-200 mm. The black ceramic layer 24 serves to conceal the portion (for example, a bonding portion of urethane or the like) at which the vehicle windshield 10A is attached to a vehicle body. It is not necessary that the black ceramic layer 24 be provided throughout the peripheral portion of the window plate 20, and the black ceramic layer 24 may be provided partially in the peripheral portion. In addition, it is not necessary that the belt width of the black ceramic layer 24 be the same in the upper, lower, right, and left sides. Furthermore, it is not necessary that the belt width of any given side be constant from one end to the other end. In the vehicle windshield 10A, the black ceramic layer 24 has a greater width at the center portion on the upper side in order to conceal the portion where various sensors are attached and has a smaller width in the remaining portion.

The black ceramic layer 24 may be provided on any one of the first surface 21a, the second surface 21b, the third surface 22a, and the fourth surface 22b. From the viewpoint of adhesiveness with the anti-fogging film and/or the optical device, the black ceramic layer 24 is preferably formed on a surface other than the surface of the window plate 20 on the vehicle interior side, that is, on a surface other than the first surface 21a.

In the vehicle windshield 10A, the region where the black ceramic layer 24 is formed is a shading region. The shading region is a region that blocks at least visible light rays and is provided in order to conceal a portion that needs to be concealed, such as the portion of the vehicle windshield 10A that is attached to the vehicle body, for example. The degree with which the visible light rays are blocked in the shading region can be adjusted as appropriate in accordance with the purpose for which the shading region is provided. For example, when the shading region is provided for the purpose of concealment as described above, the degree of light blocking may be so adjusted as not to allow the visible light rays to pass therethrough to an extent that at least the portion that needs to be concealed can be concealed.

The black ceramic layer 24 may be obtained as follows. Specifically, powder of a heat-resistant black pigment and low-melting-point glass powder may be mixed into a resin and a solvent and kneaded to obtain a black ceramic paste. This black ceramic paste may be applied to a desired region on a light-transmissive substrate through printing or the like and baked through heating. The black ceramic layer 24 may be formed as a unitary film that is continuous throughout the layer or may be formed by a dot pattern or the like that is a collection of tiny dots.

As illustrated in FIG. 5, the anti-fogging film 30A of the vehicle windshield 10A has a layered structure composed of the two layers—the ground layer 31 and the upper layer 32. The ground layer 31 is a layer that makes contact with the window plate 20. The upper layer 32 is a layer so disposed as to overlie the ground layer 31 and is a layer disposed the farthest from the window plate 20 on the vehicle interior side. The anti-fogging film in the vehicle windshield according to the present invention is not limited to a two-layer structure and may have a monolayer structure or a three-layer or higher structure, such as a three-layer structure or a four-layer structure.

With regard to the film thickness of the anti-fogging film 30A, it suffices that the minimum film thickness of the total film thickness of the ground layer 31 and the upper layer 32 be no less than 5 µm. When the anti-fogging film 30A is constituted by the two layers—the ground layer 31 and the upper layer 32, typically, the ground layer 31 is a layer bonding the upper layer 32 and the window plate 20 together, and the upper layer 32 is an anti-fogging layer that provides the window plate 20 with the anti-fogging functionality. With regard to the film thickness of the anti-fogging film 30A, the total film thickness of the ground layer 31 and the upper layer 32 is preferably 5-30 µm or particularly preferably 7-30 µm. Even when the anti-fogging film is constituted by a single layer or by three or more layers, it is preferable that the film thickness fall within a similar range. However, in order for the anti-fogging film 30A to function as an anti-fogging film, the anti-fogging film includes an anti-fogging layer as an essential layer. When the anti-fogging layer is constituted by two or more layers, the film thickness of the anti-fogging layer is preferably 3-28 µm or more preferably 5-25 µm.

In one specific example of the anti-fogging film 30A, the ground layer 31 and the upper layer 32 are each an organic resin-based coating film. When the anti-fogging layer is formed of an organic resin-based coating film, a water-absorbing resin can be used an organic resin. Examples of the water-absorbing resin to be used for the anti-fogging layer include an epoxy resin, a urethane resin, and an acrylic resin, and these are all highly transparent.

In the vehicle windshield according to the present invention, the right and left sides and the lower side of the region where the anti-fogging film is formed may include a region that overlaps the region where the black ceramic layer is formed. In other words, the anti-fogging film may be formed such that a portion of its end portion overlaps the black ceramic layer serving as a shading region. This configuration is preferable in that the right and left sides and the lower side of the anti-fogging film become less noticeable.

Figure 6:
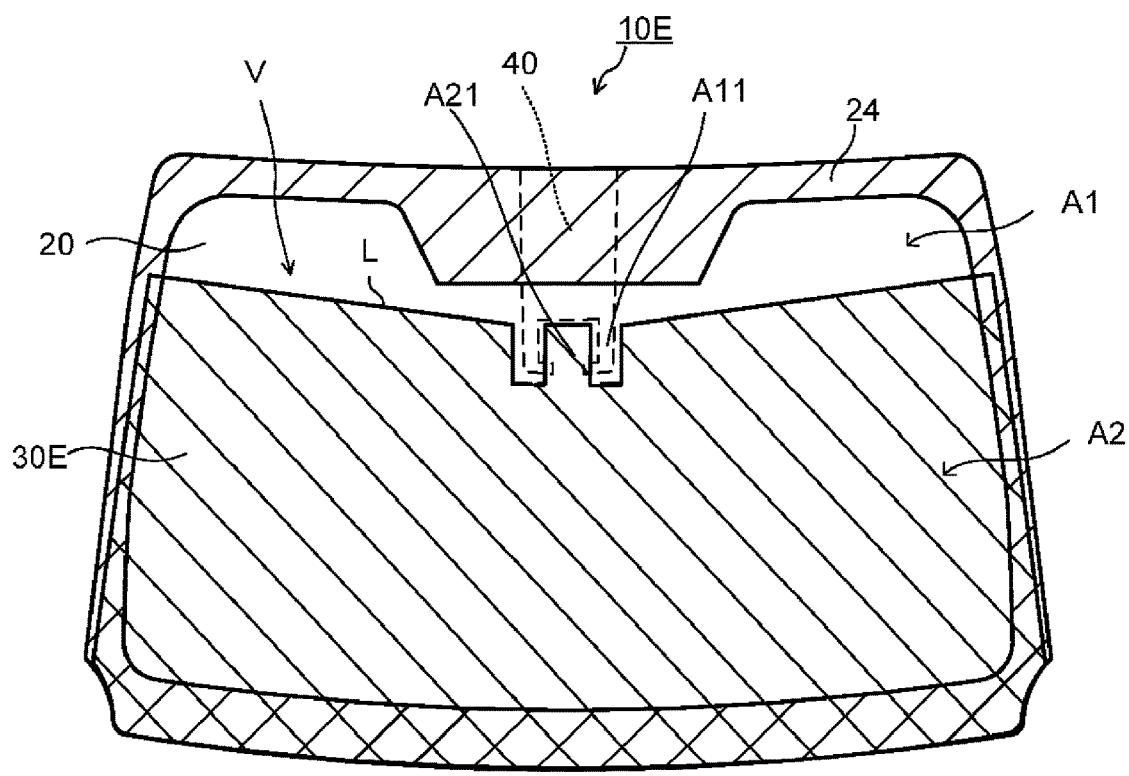
FIG. 6 is a configuration diagram of another example of an embodiment of a vehicle windshield according to the present invention.

With regard to the vehicle windshield according to an embodiment of the present invention, FIG. 6 illustrates an example of a vehicle windshield in which the region where the anti-fogging film is formed is so provided as to overlap the region where the black ceramic layer is formed. In the present specification, "the region so provided as to overlap the region where the black ceramic layer is formed" does not necessarily mean that the two regions are so provided as to be physically in contact with each other, and the expression includes the meaning that the two regions overlap each other as viewed in the front view.

A vehicle windshield 10E illustrated in FIG. 6 has the same configuration as the vehicle windshield 10A except that an anti-fogging film 30E that differs from the anti-fogging film 30A in terms of the region where the anti-fogging film 30A is formed in the vehicle windshield 10A is provided. The anti-fogging film 30E is similar to the anti-fogging film 30A except that the right and left sides and the lower side of the region where the anti-fogging film 30E is formed overlap the region where the black ceramic layer 24 is formed and except for the following points.

In the vehicle windshield 10E, the anti-fogging film 30E is so formed as to extend from the see-through region V into the region outside the see-through region V, that is, into the region where the black ceramic layer 24 is formed. Therefore, with regard to the outer periphery, of the outer periphery of the anti-fogging film 30E, that is present in the see-through region V, at least the boundary between the first region and the second region excluding the projection portion is essentially the boundary line L having the feature of the present invention described above. Specifically, the stated boundary is essentially the boundary line having no perspective distortion at the boundary between the two regions divided by this boundary line and having a linewidth of 10-200 µm that is visually recognized by scattering of incoming light. The boundary line between the projection portion of the second region in the anti-fogging film 30E and the first region and the outer periphery of the anti-fogging film 30E that is present outside the see-through region V may or may not have the above-described feature. In this respect, the anti-fogging film 30E differs from the anti-fogging film 30A, of which the entire outer periphery is present within the see-through region V and of which the entire outer periphery is constituted by the boundary line having the feature of the present invention (it is to be noted that, in the anti-fogging film 30A as well, the boundary line between the projection portion of the second region and the first region does not need to have the feature of the boundary line L).

In the vehicle windshield 10E, the boundary line L extends from substantially one end portion of the window plate 20 to substantially the other end portion of the window plate 20 in the widthwise direction of the vehicle. In other words, the boundary line L having the above-described feature not only lies within the see-through region V but also extends into the region where the black ceramic layer 24 is formed. In the anti-fogging film 30E, the presence of perspective distortion and/or the linewidth of the boundary line cannot be measured within the region where the black ceramic layer 24 is formed. However, the right and left sides on the outer periphery have a structure similar to that of the boundary line L having the above-described feature, as illustrated in FIG. 5, for example. Meanwhile, the lower side of the anti-fogging film 30E coincides with the lower side of the window plate 20 and thus does not serve as a boundary line.

In a case in which, for example, the anti-fogging film 30E is so formed as to overlap the region where the black ceramic layer 24 is formed as in the vehicle windshield 10E, the anti-fogging film does not need to be present in a region of the vehicle windshield where an adhesive for attaching the vehicle windshield to the vehicle body is provided. This is because the presence of the anti-fogging film in the region where an adhesive for attaching the vehicle windshield to the vehicle body is provided makes it difficult to ensure sufficient bonding strength.

Thus far, vehicle windshields according to some embodiments of the present invention have been described with reference to the vehicle windshields 10A to 10E illustrated in FIGS. 1 to 6. The present invention, however, is not limited to these embodiments, and changes and modifications can be made to these embodiments without departing from the spirit and the scope of the present invention.

Hereinafter, described is a method of forming an anti-fogging film having a substantially constant film thickness in the vicinity of the boundary line L and having an end portion shaped such that an end surface along the boundary line L is substantially perpendicular to a principal surface of a window plate in a vehicle windshield according to an embodiment of the present invention.

An anti-fogging film can be formed on a window plate in a vehicle windshield according to an embodiment through, for example, a well-known wet coating technique. In the wet coating technique, a coating liquid that includes a solvent and a component that allows an anti-fogging film to be formed through a reaction, drying, or the like is prepared; this coating liquid is applied onto a surface on which the anti-fogging film is to be formed, that is, onto the principal surface of the window plate of the vehicle windshield that is on the vehicle interior side; and the coating liquid is dried with the solvent being removed therefrom and is allowed for a reaction to form the anti-fogging film.

The wet coating technique is suitable for forming a film having, for example, a uniform and relatively great film thickness of 5-30 μm, which is the film thickness preferable for the anti-fogging film described above. As long as an anti-fogging film having a predetermined film thickness can be formed, the anti-fogging film may also be formed through a dry coating technique. The following description on the method of forming an anti-fogging film is for the wet coating technique, but the technique for decoating an end portion, for example, can also be applied in the dry coating technique, as in the case of the wet coating technique.

The coating liquid can be applied onto the surface of the window plate on the vehicle interior side through, for example, a flow coating technique, a spin coating technique, a spray coating technique, a flexographic printing technique, a screen printing technique, a gravure printing technique, a roll coating technique, a meniscus coating technique, a die coating technique, or a wipe technique.

When the anti-fogging film is composed of a ground layer and an upper layer, the anti-fogging film may be formed by first applying a coating liquid for forming the ground layer onto the surface of the window plate on the vehicle interior side and then applying a coating liquid for forming the upper layer over the ground layer. It is preferable that the ground layer be so formed as to extend slightly outside the upper layer having desired dimensions in particular at the upper side and the right and left sides. This is because the absence of the ground layer underneath the upper layer produces a region where sufficient bonding strength cannot be obtained.

It is acceptable that the anti-fogging film becomes thicker toward the lower side of the vehicle windshield. Such a design can make the lower portion of the vehicle windshield less likely to fog up, for example. It is often the case that the driver's field of view centers on the lower portion of the vehicle windshield. The above-described configuration, for example, allows the driver to use a defogger after the upper portion of the vehicle windshield starts fogging up, allowing for safer driving.

It is acceptable that the anti-fogging film becomes thicker toward the upper side of the vehicle windshield. Such a design can make the upper portion of the vehicle windshield less likely to fog up, for example. A defogger is near the lower side of the vehicle windshield, and thus an occurrence of fogging can be prevented more easily with the defogger in the lower portion of the vehicle windshield. However, the effect of the defogger reaches the upper portion less easily, and thus making the upper portion thicker makes it possible to achieve well-balanced anti-fogging performance throughout the vehicle windshield through the combination with the defogger, allowing for safer driving.

In the wet coating technique, the region that is coated with the coating liquid serves as the region where the anti-fogging film is formed. However, at the tip of an end portion of the anti-fogging film obtained by applying the coating liquid and allowing the coating liquid to dry and react, the film thickness gradually decreases typically from the side closer to the center of the region where the anti-fogging film is formed toward the outer peripheral side. How the film thickness gradually decreases at the tip of an end portion of such an anti-fogging film is illustrated, for example, in FIG. 7A described below, as can be seen from the shape of a side surface of the anti-fogging film that has not been decoated. In the vehicle windshield provided with the anti-fogging film having an end portion of such a shape, perspective distortion arises if the boundary between the region where the anti-fogging film is formed and the region where no anti-fogging film is formed is present in the see-through region.

As illustrated in FIGS. 1 to 6, in the vehicle windshields according to the embodiments of the present invention, the upper side of the anti-fogging film is present in the upper portion of the see-through region of the vehicle windshield, and thus perspective distortion is more noticeable. Furthermore, since the anti-fogging film has a minimum film thickness of no less than 5 µm, perspective distortion arises more easily. In addition, when the anti-fogging film has a layered structure with two layers and the ground layer is larger than the upper layer, for example, both an end portion of the ground layer and an end portion of the upper layer are present in the upper side portion of the foregoing anti-fogging film, and thus perspective distortion becomes even more noticeable.

Accordingly, in order to suppress perspective distortion that arises at a boundary between the region where the anti-fogging film is formed and the region where no anti-fogging film is formed, the perspective distortion can be improved by so processing the sectional shape of the end portion as to have the sectional shape illustrated in FIG. 5, for example. In one example method of processing the end portion of the anti-fogging film, a portion where the film thickness gradually decreases is removed (decoated) up to an end of a region at which the film thickness becomes constant.

Figure 7A:
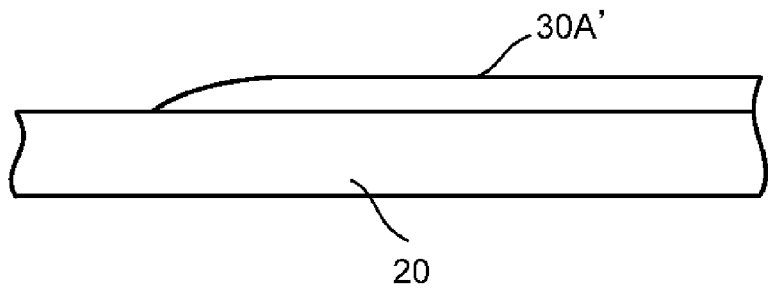
FIGS. 7A, 7B, and 7C are schematic diagrams illustrating a technique for decoating a coating film in a vehicle windshield according to some examples.
Figure 7A:
Figure 7B:
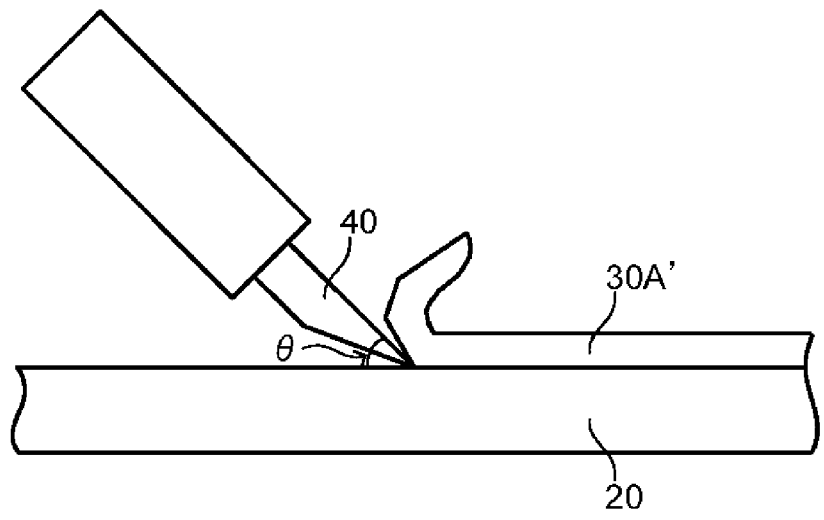
Figure 7B:
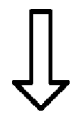
Figure 7C:
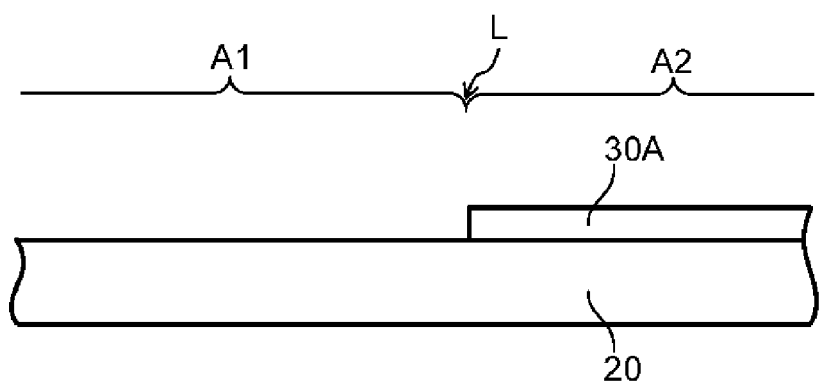

FIGS. 7A, 7B, and 7C are schematic diagrams illustrating a technique for obtaining the vehicle windshield 10A illustrated in FIG. 1 by, for example, decoating an end portion of an anti-fogging film formed through the wet coating technique as described above to produce the anti-fogging film 30A having the section illustrated in FIG. 5. In FIGS. 7A, 7B, and 7C, the layered structure of the two layers in the anti-fogging film and the layered structure of the three layers in the window plate 20 are omitted, and the anti-fogging film and the window plate are each depicted as a single layer as a whole. The anti-fogging film that has not gone through decoating is denoted by the reference character 30A'.

FIG. 7A is a side view illustrating a state held when the anti-fogging film 30A' has been formed on the window plate 20 through the wet coating technique but has not been decoated. FIG. 7B is a side view illustrating how the anti-fogging film 30A' formed on the window plate 20 illustrated in FIG. 7A is decoated with a cutter. FIG. 7C illustrates a side view of the window plate 20 provided with the anti-fogging film 30A, in which a tip portion of the anti-fogging film 30A' has been removed through decoating as illustrated in FIG. 7B and the boundary line L having the feature of the embodiment of the present invention has been formed. FIG. 7C corresponds to the sectional view illustrated in FIG. 5.

The cutter being used in FIG. 7B is, for example, a single-edged cutter 40, and FIG. 7B illustrates a state in which the edge is facing toward the window plate 20. Decoating is performed as described below, for example. Specifically, the single-edged cutter 40 is placed such that the back of the edge of the single-edged cutter 40 that faces the anti-fogging film 30A' is an angle θ relative to the window plate 20, and the single-edged cutter 40 is inserted along the window plate 20 from the tip of the anti-fogging film 30A' to peel off the anti-fogging film 30A'. In the decoating, the end portion of the anti-fogging film 30A' that has been peeled off is removed through an appropriate method. The cutter may be single-edged or double-edged. The angle θ to be held when the cutter is inserted is preferably in a range of 40-70 degrees or more preferably in a range of 50-60 degrees. Setting the angle θ within the stated range makes it easier to adjust the linewidth of the boundary line to 10-200 µm or preferably to 10-150 µm.

The anti-fogging film can be decoated with the use of, for example, a laser, a grinder, a sandblast machine, a resin blast machine, a cutter, or the like. Among the above, the use of a cutter for decoating the anti-fogging film is preferable as it makes the appearance of the boundary line L better as compared to a case in which other means are used.

The vehicle windshield according to the present invention obtained as described above is used suitably to constitute an article for a vehicle through a combination of the vehicle windshield with various optical devices.

An article for a vehicle according to the present invention includes the vehicle windshield according to the present invention and an optical device attached on a vehicle interior side of the vehicle windshield within the first region and in the vicinity of an outer side of the projection portion of the second region, and the optical device transmits a signal to a vehicle exterior side of the vehicle windshield through the projection portion of the second region and/or receives a signal from the vehicle exterior side of the vehicle windshield through the projection portion of the second region.

Examples of the optical device included in the article for a vehicle according to the present invention include an image sensor that captures an image of a space in front of a vehicle and a range finding sensor that measures the distance to an object in front of a vehicle. With an example in which the vehicle windshield 10A illustrated in FIG. 1 is used, an article for a vehicle according to an embodiment of the present invention will be described hereinafter.

In FIG. 1, an optical device 40 obtained when the optical device 40 is attached to the vehicle windshield 10A on the vehicle interior side is indicated by the dashed line. The optical device 40 typically includes an optical member for transmitting and/or receiving the aforementioned signal, a bracket for supporting the optical member and fixing the optical member to the vehicle windshield, and a housing covering the optical member and the bracket. The dashed line illustrated to indicate the optical device 40 indicates mainly the outer periphery of the housing.

The optical device 40 is attached, with the bracket, to the attachment region A11 of the first region A1, which is the region where the anti-fogging film 30A is not formed, in the see-through region V of the vehicle windshield 10A on the vehicle interior side. When the optical device 40 is to be attached, the optical device 40 is attached such that the optical member is disposed at a position where the optical member can transmit and/or receive a signal through the projection portion A21 of the second region A2, which is the region where the anti-fogging film 30A is provided, in the vehicle windshield 10A.

As the bracket of the optical device 40 is attached directly to the window plate 20 in the region where the anti-fogging film 30A is not provided, high adhesiveness can be ensured, and the optical device 40 can be attached stably. In addition, as described above, the minimum film thickness of the anti-fogging film 30A in the second region A2 is no less than 5 µm, and the film thickness that allows for a sufficient level of anti-fogging performance is ensured in the projection portion A21 as well. Thus, the signal from the optical member can be transmitted and/or received through the projection portion A21 stably and reliably without being affected by fogging in a high-humidity environment.

Furthermore, in the article for a vehicle according to an embodiment of the present invention, when the boundary between the projection portion A21 and the attachment region A11 is constituted by the boundary line L having no perspective distortion in the vehicle windshield 10A, the optical member can transmit and/or receive a signal stably and reliability without being affected by the perspective distortion. In addition, when the boundary between the projection portion A21 and the attachment region A11 is formed by the boundary line L having a linewidth of 10-200

μm that is visually recognized by scattering of incoming light, the boundary can be visually recognized with ease, and the optical device can be installed at an appropriate position. When the linewidth of the boundary line L is 10-200 there is almost no influence on the transmission and/or the reception of a signal by the optical member.

The boundary line, having the characteristics described above, between the region where the anti-fogging film is formed and the region where no such an anti-fogging film is formed can be applied as a boundary line that suppresses perspective distortion not only in the vehicle windshield or the article for a vehicle but also in other articles that transmit and/or receive a signal through an article with the use of an optical device, as in the article for a vehicle described above.

EXAMPLES

Hereinafter, the present invention will be described in concrete terms with reference to examples, but the present invention is not limited by these examples. In the following examples, with regard to a window plate provided with an anti-fogging film having a film thickness of no less than 5 the characteristics of a boundary line between a region where the anti-fogging film was provided and a region where no anti-fogging film was provided as viewed in the front view were evaluated.

Example 1

A vehicle windshield having a configuration similar to the one illustrated in FIG. 1 was fabricated through the following method. A laminated glass in which an intermediate film was sandwiched by two glass plates and that included a black ceramic layer formed into a belt throughout the peripheral portion was used as a window plate. An epoxy resin-based anti-fogging film including a ground layer and an upper layer was formed through a wet coating technique throughout a lower portion of the window plate with a predetermined width left above the anti-fogging film to provide a first region in an upper portion of a see-through region of the window plate where no anti-fogging film was provided. The obtained anti-fogging film was an anti-fogging film in which the film thickness gradually decreased at a tip of an end portion of the region where the anti-fogging film was formed, similar to the one illustrated in FIG. 7A. The anti-fogging film had a film thickness of approximately 15 μm in a region where the film thickness was substantially uniform (hereinafter, referred to as "the film thickness of the planar portion") except at the end portion and so on where the film thickness gradually decreased.

At the tip of the end portion where the film thickness of the anti-fogging film formed on the laminated glass as described above, a single-edged cutter was inserted at an angle θ of 40 degrees relative to the glass, as illustrated in FIG. 7B, to peel off the anti-fogging film, and thus the anti-fogging film was decoated up to the position illustrated in FIG. 7C to obtain a laminated glass (A) provided with the anti-fogging film. The obtained laminated glass (A) provided with the anti-fogging film included the first region in the upper portion of the see-through region where no anti-fogging film was provided and the second region in the lower portion where the anti-fogging film was provided. The second region included a recess portion that was recessed downward provided at a substantially center portion on the upper side, similar to the one illustrated in FIG. 1, and had a shape in which a projection portion was so formed as to project upward from a bottom portion of the recess portion. In addition, in this laminated glass provided with the anti-fogging film, the boundary between the first region and the second region was constituted by the boundary line L formed through the decoating described above.

(Evaluation)

With regard to the boundary line L in the obtained laminated glass (A) provided with the anti-fogging film, the presence of perspective distortion and the linewidth of the boundary line L were measured through the methods described above. In addition, a deviation of the film thickness at the end portion within a 1-mm range inward from the position of the boundary line L in the anti-fogging film was evaluated.

Furthermore, the anti-fogging performance of the obtained laminated glass (A) provided with the anti-fogging film was evaluated.

(1) Perspective Distortion

Figure 8A:
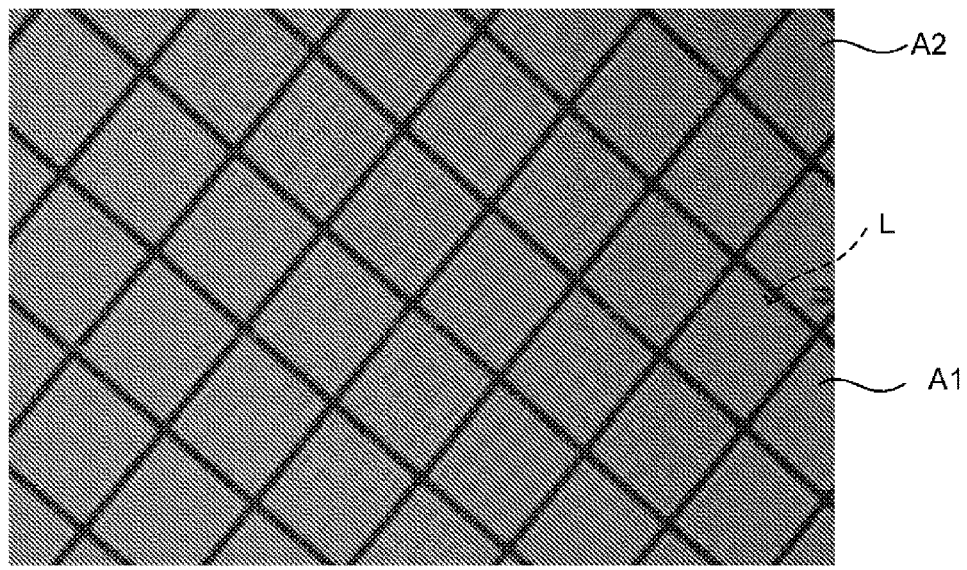
FIG. 8A illustrates an image captured for evaluating perspective distortion in Example 1.
Figure 9A:
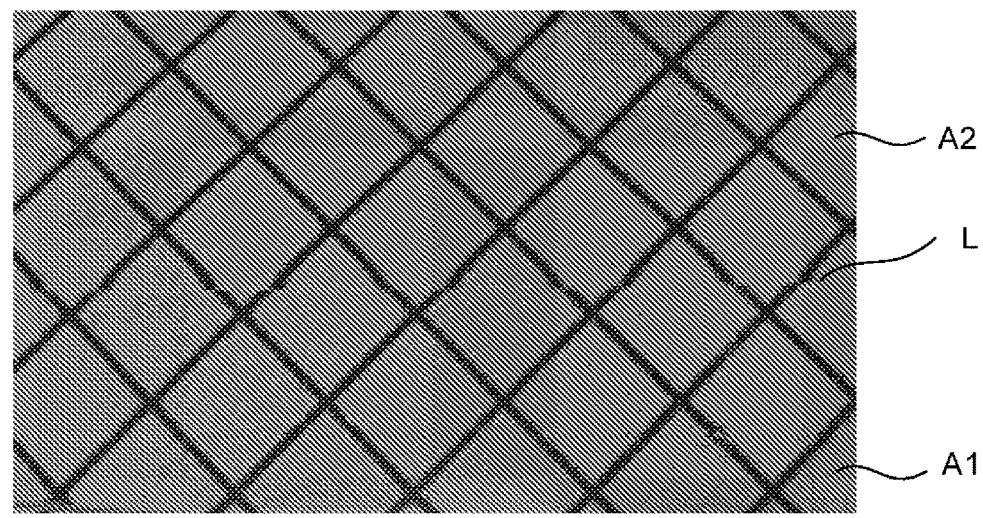
FIG. 9A illustrates an image captured for evaluating perspective distortion in Comparative Example 1.
Figure 10A:
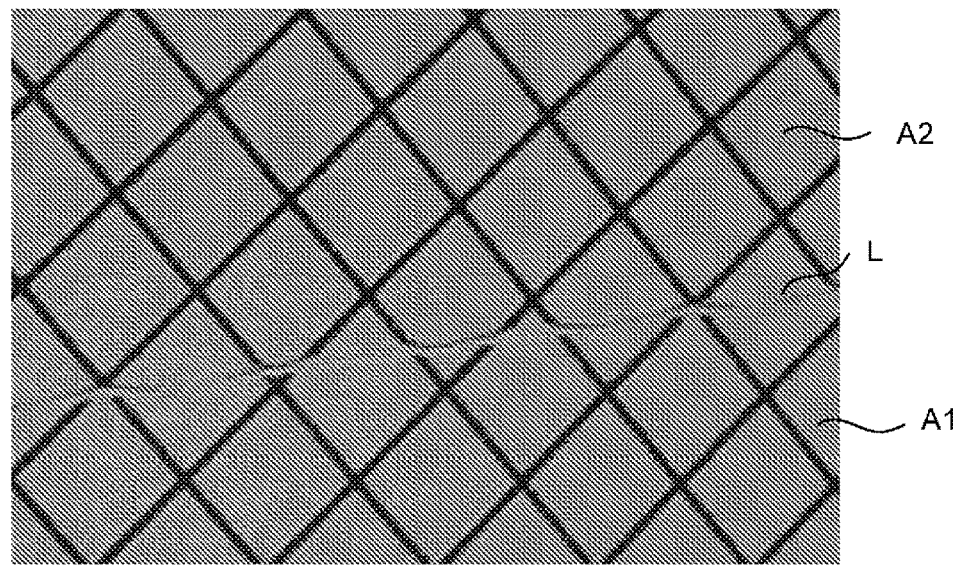
FIG. 10A illustrates an image captured for evaluating perspective distortion in Comparative Example 2.

FIG. 8A illustrates an image captured for determining the presence of perspective distortion in the laminated glass (A) provided with the anti-fogging film. In FIG. 8A, the first region is denoted by A1, the second region is denoted by A2, and the boundary line L is denoted by L (hereinafter, similar reference characters are used in captured images of examples and comparative examples). With regard to the result, neither a deformation nor a break caused by the boundary line L was observed in the grid pattern, and thus the evaluation indicated that "no perspective distortion was present." In FIG. 8A, the position of the boundary line L is indicated by a dashed arrow, but the boundary line L could not be visually recognized from the image. The boundary line L was so formed as to traverse the image through substantially the center thereof, as can be seen in FIG. 9A or 10A, for example. Hereinafter, when the position of the boundary line L is indicated by a dashed arrow, this boundary line L is in a state similar to the foregoing state.

(2) Linewidth of Boundary Line L

Figure 8B:
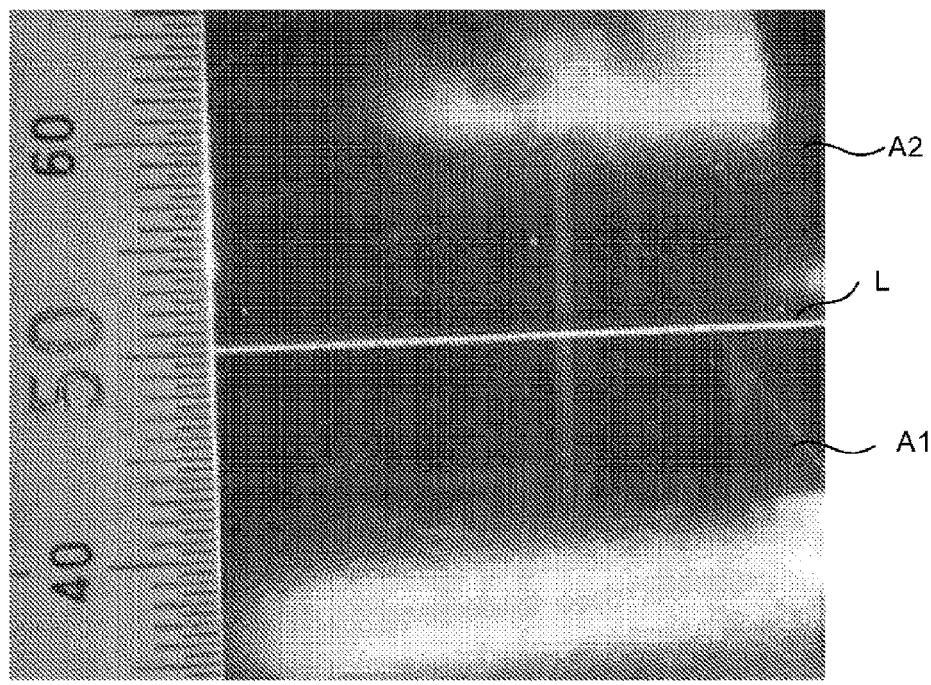
FIG. 8B illustrates an image captured under a condition for measuring a linewidth of a boundary line in Example 1.

From an image of the laminated glass (A) provided with the anti-fogging film captured under the condition for measuring the linewidth described above, the boundary line L was visually recognized as a boundary line having a predetermined linewidth when incoming light is scattered thereby. In addition, from an image of the boundary line L captured through the method similar to that illustrated in FIG. 8B and enlarged by 5×, the maximum value of the linewidth measured in the direction orthogonal to the lengthwise direction within a 100-mm stretch of the boundary line L, that is, the linewidth of the boundary line L according to the present invention was 200 μm.

(3) Deviation of Film Thickness at End Portion

With the use of a captured image of a section of the laminated glass (A) provided with the anti-fogging film cut along a plane orthogonal to the boundary line L, the deviation of the film thickness at an end portion, which was a value (%) obtained by subtracting, from 100%, the percentage (%) of a minimum value relative to a maximum value (100%) of the film thickness, was calculated. The obtained value was 0%, and the film thickness was uniform without any deviation.

(4) Anti-Fogging Performance

The laminated glass (A) provided with the anti-fogging film was attached to a vehicle such that the anti-fogging film was located on the vehicle interior side, and a humidifier was installed at each of a driver seat and a passenger seat. Before the evaluation was carried out, the temperature inside the vehicle was 0° C., and the humidity inside the vehicle was 50% RH. Before the evaluation was carried out, the outside temperature was 0° C., and the outside humidity was 80%

RH. The outside air introduction rate through air conditioning was 30%. After the air conditioning and the humidifiers started operating with all the doors of the vehicle being closed, the time it took for the projection portion of the region where the anti-fogging film was formed started to fog up was measured. The humidity supplying rate with the humidifiers was 62 gH$_2$O/h, and the evaluation was carried out for 30 minutes.

With regard to the laminated glass (A) provided with the anti-fogging film, the method of processing the end portion of the anti-fogging film and the evaluation result are shown in Table 1. The minimum film thickness in the entire anti-fogging film in the laminated glass (A) provided with the anti-fogging film was equal to the minimum film thickness at an end portion within a 1-mm range from the edge, and this relationship applied similarly in a laminated glass provided with an anti-fogging film according to each of the examples described below.

Examples 2 and 3

A laminated glass (B) provided with an anti-fogging film according to Example 2 and a laminated glass (C) provided with an anti-fogging film according to Example 3 were obtained in a manner similar to Example 1 except for the following. In Example 2, the film thickness of the planar portion of the anti-fogging film was approximately 24 μm, and the decoating was performed by inserting a single-edged cutter at an angle θ of 53 degrees relative to the glass in a manner similar to that illustrated in FIG. 7B to peel off the anti-fogging film. In Example 3, the film thickness of the planar portion of the anti-fogging film was approximately 15 μm, and the decoating was performed by inserting a single-edged cutter at an angle θ of 50 degrees relative to the glass in a manner similar to that illustrated in FIG. 7B to peel off the anti-fogging film.

The obtained laminated glasses (B) and (C) each provided with the anti-fogging film were evaluated on the above (1) to (3) in a manner similar to Example 1 described above. The results are shown in Table 1.

Comparative Example 1

A laminated glass (D) provided with an anti-fogging film in which the tip of the end portion of the anti-fogging film where the film thickness gradually decreased according to Example 1 described above was not decoated was evaluated on the above (1) to (3) in a manner similar to Example 1 described above.

Figure 9B:
FIG. 9B illustrates an image captured under a condition for measuring a linewidth of a boundary line in Comparative Example 1.

FIG. 9A illustrates an image captured for determining the presence of perspective distortion in the laminated glass (D) provided with the anti-fogging film, and FIG. 9B illustrates an image of the laminated glass (D) provided with the anti-fogging film captured under the condition for measuring the linewidth described above. From these captured images, it was possible to confirm that the perspective distortion caused by the boundary line L was present in the laminated glass (D) provided with the anti-fogging film and that the boundary line L was not visually recognized as a boundary line having a predetermined linewidth when incoming light is scattered thereby. In addition, the tip of the end portion had the shape illustrated in FIG. 7A, and the minimum value of the film thickness could not be measured. Thus, for the deviation of the film thickness at the end portion, the minimum value of the film thickness was calculated as the film thickness of the ground layer. The result was 80%. These results are shown in Table 1. [Comparative Examples 2 and 3]

An anti-fogging film was formed in a manner similar to Example 1 except that a region corresponding to the first region of the laminated glass was masked with the use of a masking tape having a thickness of 25 μm in Comparative Example 2 and with the use of a masking tape having a thickness of 55 μm in Comparative Example 3. Thereafter, the masking tapes were peeled off, and a laminated glass (E) provided with an anti-fogging film according to Comparative Example 2 (film thickness at planar portion: approximately 17 μm) and a laminated glass (F) provided with an anti-fogging film according to Comparative Example 3 (film thickness at planar portion: approximately 19 μm) were obtained. The obtained laminated glasses (E) and (F) each provided with the anti-fogging film were evaluated on the above (1) to (3) in a manner similar to Example 1 described above.

Figure 10B:
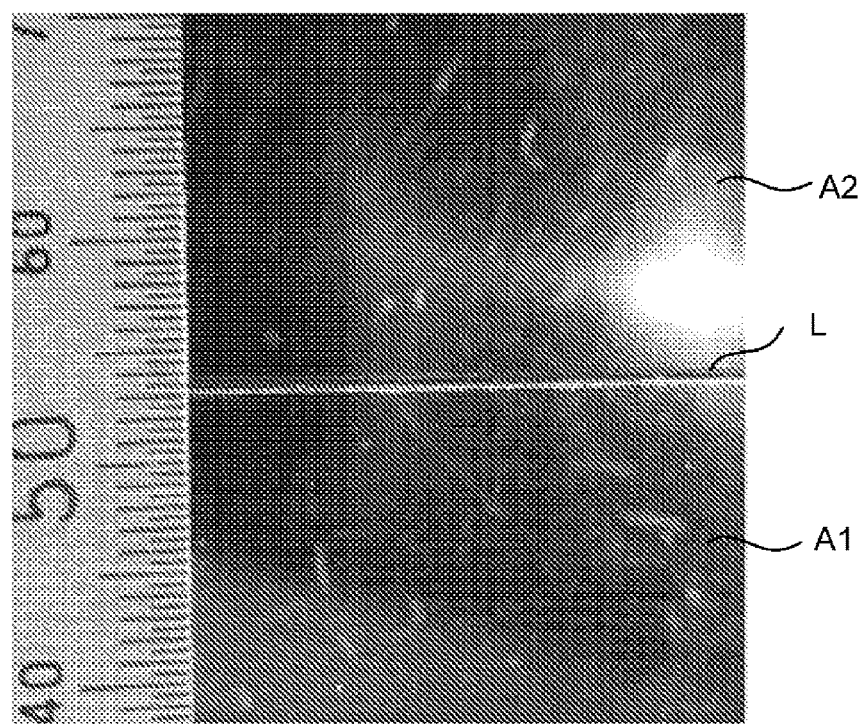
FIG. 10B illustrates an image captured under a condition for measuring a linewidth of a boundary line in Comparative Example 2.

FIG. 10A illustrates an image captured for determining the presence of perspective distortion in the laminated glass (E) provided with the anti-fogging film, and FIG. 10B illustrates an image of the laminated glass (E) provided with the anti-fogging film captured under the condition for measuring the linewidth described above. From these captured images, the perspective distortion caused by the boundary line L was present in the laminated glass (E) provided with the anti-fogging film, and the boundary line L was visually recognized as a boundary line having a predetermined linewidth when incoming light is scattered thereby. Here, aside from the boundary line that scattered the light, a state of the boundary line being curved outward toward the second region could also be observed along the boundary line. With regard to the laminated glass (E) provided with the anti-fogging film, the film thickness of the anti-fogging film was maximum at the end surface at the position of the boundary line L and gradually decreased toward the inner side, and the deviation of the film thickness at the end portion was 71%.

With regard to the laminated glass (F) provided with the anti-fogging film, the perspective distortion caused by the boundary line L was observed. In addition, an image of the laminated glass (F) provided with the anti-fogging film captured under the condition for measuring the linewidth was similar to that of the laminated glass (E) provided with the anti-fogging film. The deviation of the film thickness at the end portion of the laminated glass (F) provided with the anti-fogging film was 70%.

With regard to the laminated glasses (E) and (F) each provided with the anti-fogging film, the method of processing the end portion of the anti-fogging film and the evaluation result are shown in Table 1.

Comparative Example 4

A laminated glass (G) provided with an anti-fogging film according to Comparative Example 4 was obtained in a manner similar to Example 1 except for the following. The film thickness of the planar portion of the anti-fogging film was approximately 15 μm, and the decoating was performed by inserting a single-edged cutter at an angle θ of 75 degrees relative to the glass in a manner similar to that illustrated in FIG. 7B to peel off the anti-fogging film. The obtained laminated glass (G) provided with the anti-fogging film was evaluated on the above (1) to (3) in a manner similar to Example 1 described above. The linewidth of the boundary line L in the laminated glass (G) provided with the anti-fogging film according to Comparative Example 4 greatly exceeded the linewidth defined in the present invention, and it was hard to say that an improvement was made against a negative influence on the driving field of view as compared to a conventional vehicle windshield having perspective distortion. In addition, the laminated glass (G) provided with the anti-fogging film lacked in the design sophistication. With regard to the laminated glass (G) provided with the anti-fogging film, the method of processing the end portion of the anti-fogging film and the evaluation result are shown in Table 1.

Comparative Example 5

Figure 11:
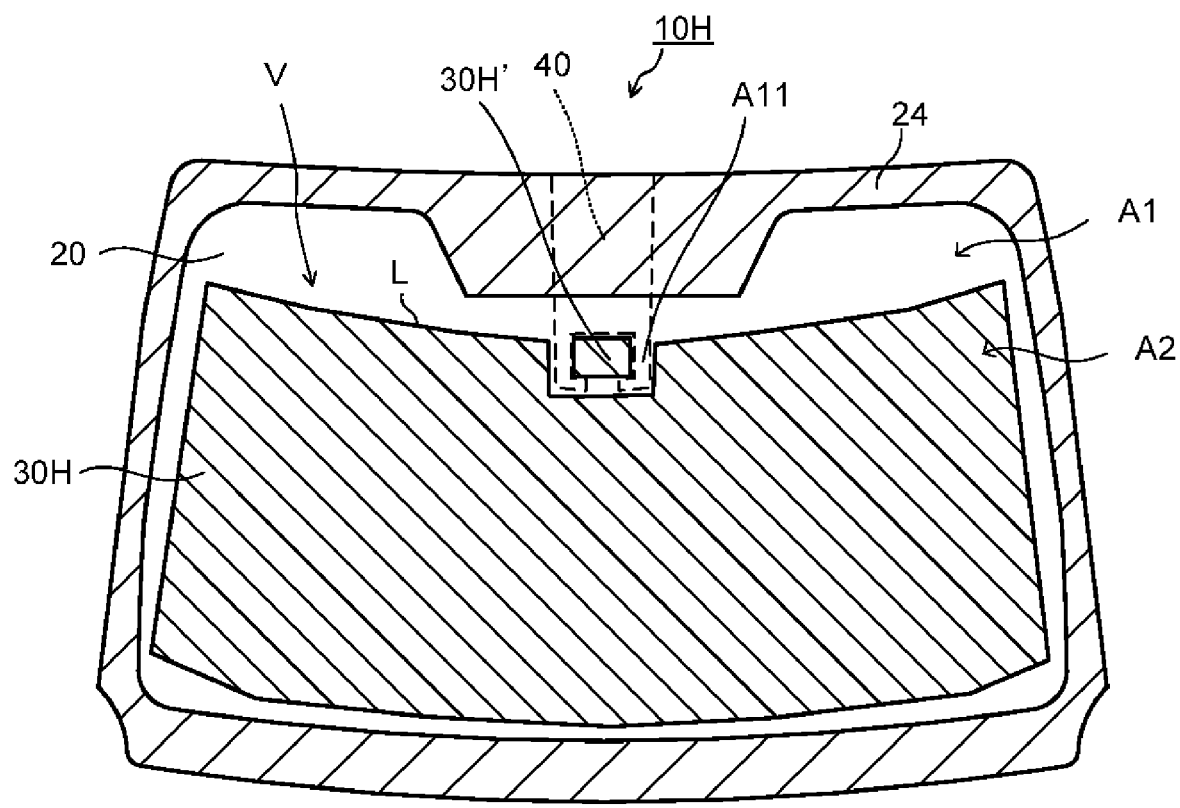
FIG. 11 is a configuration diagram of a vehicle windshield according to Comparative Example 5.

With the use of a laminated glass similar to the one used in Example 1 as a window plate, a laminated glass provided with an anti-fogging film that was not decoated was fabricated in a manner similar to Example 1. Thereafter, as illustrated in FIG. 11, the anti-fogging film was decoated such that an island-like anti-fogging film 30H' was present in a region corresponding to the projection portion of the anti-fogging film (corresponding to the anti-fogging film 30A illustrated in FIG. 1) of the laminated glass (A) provided with the anti-fogging film according to Example 1 such that the anti-fogging film 30H' was spaced apart from an anti-fogging film 30H provided in a region corresponding to the main portion. The decoating was performed through a method similar to that of Example 1. In this manner, a laminated glass (H) provided with an anti-fogging film according to Comparative Example 5 (denoted by 10H in FIG. 11) was obtained. The denotations of the reference characters other than 10H, 30H, and 30H' indicated in FIG. 11 are similar to the denotations of the reference characters indicated in FIG. 1.

The obtained laminated glasses (H) provided with the anti-fogging film was evaluated on the above (1) to (4) in a manner similar to Example 1 described above. The boundary line L in the laminated glass (H) provided with the anti-fogging film was evaluated on the outer periphery of the anti-fogging film 30H in the main portion, and it is possible to assume that a similar result can be obtained on the outer periphery of the island-like anti-fogging film 30H'. In addition, with regard to the evaluation on (4), the time it took for the island-like anti-fogging film 30H' to start fogging up was measured. In the anti-fogging film 30H in the main portion, the time it took to start fogging up was 15 minutes. The evaluation results on (1) to (4) are shown in Table 1.

TABLE 1

| Example | Processing on End Portion | Processing Method | Film Thickness of Planar Portion [μm] | Perspective Distortion | Linewidth of Boundary Line L [μm] |
|---|---|---|---|---|---|
| Example 1 | Decoat | Single-edged Cutter θ = 40° | Approx. 15 | Not Present | 200 |
| Example 2 | Decoat | Single-edged Cutter θ = 53° | Approx. 24 | Not Present | 50 |
| Example 3 | Decoat | Single-edged Cutter θ = 50° | Approx. 15 | Not Present | 20 |
| Comparative Example 1 | None | — | Approx. 15 | Present | None |
| Comparative Example 2 | Masking | Tape Thickness 25 μm | Approx. 17 | Present | 1000 or more |
| Comparative Example 3 | Masking | Tape Thickness 55 μm | Approx. 19 | Present | 1000 or more |
| Comparative Example 4 | Decoat | Single-edged Cutter θ = 75° | Approx. 15 | Not Present | 500 |
| Comparative Example 5 | Decoat | Single-edged Cutter θ = 40° | Approx. 15 | Not Present | 200 |

| | Film Thickness of End Portion within 1-mm Range | | | |
|---|---|---|---|---|
| Example | Minimum Film Thickness [μm] | Maximum Film Thickness [μm] | Deviation of Film Thickness at End Portion [%] | Anti-fogging Performance |
| Example 1 | 15 | 15 | 0 | More than 30 minutes |
| Example 2 | 24 | 24 | 0 | — |
| Example 3 | 15 | 15 | 0 | — |
| Comparative Example 1 | 3 | 15 | 80 | — |
| Comparative Example 2 | 17 | 61 | 71 | — |
| Comparative Example 3 | 19 | 65 | 70 | — |
| Comparative Example 4 | 15 | 15 | 0 | — |
| Comparative Example 5 | 15 | 15 | 0 | 17 minutes |

What is claimed is:
1. A vehicle windshield, comprising:
a window plate; and
an anti-fogging film provided on a surface of the window plate, the surface facing a vehicle interior, wherein
the vehicle windshield includes a first region and a second region within a see-through region, the anti-fogging film not being provided in the first region as viewed in a front view, the anti-fogging film being provided in the second region as viewed in the front view, the first region includes a belt-like region in an upper portion of the see-through region, the second region is a region that includes at least a test area B defined in JIS R3212 (1998) and that includes a continuous projection portion provided on an upper side, the anti-fogging film in the second region having a minimum film thickness of no less than 5 μm, and at least a boundary between the first region and the second region excluding the projection portion has no perspective distortion and is formed by a boundary line having a linewidth of 10-200 μm, the boundary line being visually recognized by scattering of incoming light.

2. The vehicle windshield according to claim 1, wherein the projection portion of the second region is used for an optical device disposed on a vehicle interior side to transmit a signal to a vehicle exterior side of the vehicle windshield through the projection portion and/or to receive a signal from the vehicle exterior side of the vehicle windshield through the projection portion, and a vicinity of an outer side of the projection portion of the second region is used as an attachment region where the optical device is attached, the vicinity being in the first region.

3. The vehicle windshield according to claim 1, wherein the anti-fogging film has a film thickness that increases toward a lower side of the vehicle windshield.

4. The vehicle windshield according to claim 1, wherein the anti-fogging film has a film thickness that increases toward an upper side of the vehicle windshield.

5. The vehicle windshield according to claim 1, wherein an upper side of the second region has a shape in which only the projection portion projects higher upward than a portion other than the projection portion.

6. The vehicle windshield according to claim 1, wherein an upper side of the second region has a shape including a recess portion that is recessed downward, the projection portion is so formed as to project upward from a bottom portion of the recess portion, and a vertex of the projection portion is at a position level with a base portion of the recess portion in the upper side.

7. The vehicle windshield according to claim 1, wherein an upper side of the second region has a shape including a recess portion that is recessed downward, the projection portion is so formed as to project upward from a bottom portion of the recess portion, and a vertex of the projection portion is located at a position lower than a base portion of the recess portion in the upper side.

8. The vehicle windshield according to claim 1, wherein an upper side of the second region has a shape including a recess portion that is recessed downward, the projection portion is so formed as to project upward from a bottom portion of the recess portion, and a vertex of the projection portion is located at a position higher than a base portion of the recess portion in the upper side.

9. The vehicle windshield according to claim 1, wherein the window plate includes a first light-transmissive substrate, a second light-transmissive substrate opposing the first light-transmissive substrate, and an intermediate film sandwiched by the first light-transmissive substrate and the second light-transmissive substrate.

10. The vehicle windshield according to claim 1, wherein the window plate includes a shading region in a peripheral portion.

11. The vehicle windshield according to claim 10, wherein the shading region is constituted by a black ceramic layer formed on a surface of the window plate, the surface being other than a surface facing a vehicle interior.

12. The vehicle windshield according to claim 1, wherein the projection portion is rectangular.

13. The vehicle windshield according to claim 2, wherein the attachment region has a width of no less than 3 mm nor more than 40 mm.

14. An article for a vehicle, the article comprising:

the vehicle windshield according to claim 1; and an optical device attached on a vehicle interior side of the vehicle windshield within the first region and in the vicinity of an outer side of the projection portion of the second region, the optical device being configured to transmit a signal to a vehicle exterior side of the vehicle windshield through the projection portion of the second region and/or to receive a signal from the vehicle exterior side of the vehicle windshield through the projection portion of the second region.

* * * * *